US012602536B2

(12) United States Patent
Dhanuka et al.

(10) Patent No.: US 12,602,536 B2
(45) Date of Patent: Apr. 14, 2026

(54) AUTOMATED RECONSTRUCTION OF GLYPH SPACING PROPERTIES

(71) Applicant: ADOBE INC., San Jose, CA (US)

(72) Inventors: Praveen Kumar Dhanuka, Howrah (IN); Arushi Jain, Delhi (IN)

(73) Assignee: ADOBE INC., San Jose, CA (US)

( * ) Notice: Subject to any disclaimer, the term of this patent is extended or adjusted under 35 U.S.C. 154(b) by 199 days.

(21) Appl. No.: 18/413,730

(22) Filed: Jan. 16, 2024

(65) Prior Publication Data

US 2025/0232108 A1 Jul. 17, 2025

(51) Int. Cl.
| | |
|---|---|
| *G06F 17/00* | (2019.01) |
| *G06F 40/109* | (2020.01) |
| *G06F 40/166* | (2020.01) |

(52) U.S. Cl.
CPC .......... *G06F 40/109* (2020.01); *G06F 40/166* (2020.01)

(58) Field of Classification Search
CPC .............................. G06F 40/109; G06F 40/166
See application file for complete search history.

(56) References Cited

U.S. PATENT DOCUMENTS

| | | | | | |
|---|---|---|---|---|---|
| 8,443,278 | B2 * | 5/2013 | Mansfield | ............. | G06F 40/106 |
| | | | | | 715/227 |
| 8,769,405 | B2 * | 7/2014 | Bacus | ................... | G06F 40/109 |
| | | | | | 715/269 |
| 9,984,053 | B2 * | 5/2018 | Waterfall | .............. | G06F 40/109 |

| | | | | | |
|---|---|---|---|---|---|
| 11,069,027 | B1 * | 7/2021 | Jain | .......................... | G06T 11/20 |
| 11,295,065 | B2 * | 4/2022 | Arora | ..................... | G06F 40/166 |
| 11,776,168 | B2 * | 10/2023 | Kumawat | ............ | G06V 30/413 |
| | | | | | 345/636 |
| 11,809,806 | B2 * | 11/2023 | Jain | ......................... | G06F 16/908 |
| 11,886,795 | B2 * | 1/2024 | Arora | .................... | G06F 40/109 |
| 12,067,351 | B2 * | 8/2024 | Schwiebert | .......... | G06F 40/151 |
| 12,211,129 | B2 * | 1/2025 | Dhanuka | .............. | G06T 11/203 |
| 2004/0189643 | A1 * | 9/2004 | Frisken | ................. | G06T 11/001 |
| | | | | | 345/467 |
| 2011/0119272 | A1 * | 5/2011 | Mansfield | ............... | G06F 16/36 |
| | | | | | 707/739 |
| 2014/0019856 | A1 * | 1/2014 | Hernandez | ............ | G06F 40/109 |
| | | | | | 715/269 |
| 2014/0022260 | A1 * | 1/2014 | Atteberry | .............. | G06T 11/203 |
| | | | | | 345/467 |
| 2014/0285495 | A1 * | 9/2014 | Kang | .................... | G06F 40/109 |
| | | | | | 345/471 |
| 2015/0347356 | A1 * | 12/2015 | Beaver | ..................... | G09G 5/26 |
| | | | | | 345/472 |

(Continued)

FOREIGN PATENT DOCUMENTS

WO      WO-2014118661 A1 *   8/2014   .......... G06F 40/274

*Primary Examiner* — Laurie A Ries

(74) *Attorney, Agent, or Firm* — Shook, Hardy & Bacon L.L.P.

(57) ABSTRACT

Methods and systems are provided for automated reconstruction of glyph spacing properties. In embodiments described herein, a document comprising a set of glyphs of a text object is accessed. A tracking pattern is determined for the set of glyphs that identifies spacing of the set of glyphs in the document based on a position of a glyph of the set of glyphs in the document relative to a corresponding position of the glyph when automatic kerning is applied. The spacing of the text object is reconstructed in the document by applying the tracking pattern to the set of glyphs.

20 Claims, 17 Drawing Sheets

(56)                   References Cited

U.S. PATENT DOCUMENTS

| | | | | |
|---|---|---|---|---|
| 2017/0053424 A1* | 2/2017 | Wang | ................... | G06F 40/109 |
| 2017/0322913 A1* | 11/2017 | Kukreja | ................ | G06F 3/0236 |
| 2017/0323007 A1* | 11/2017 | Kukreja | ................ | G06F 16/58 |
| 2021/0019366 A1* | 1/2021 | Markey | ................ | G06F 40/126 |
| 2021/0141464 A1* | 5/2021 | Jain | ....................... | G06F 3/0236 |
| 2021/0383056 A1* | 12/2021 | Jain | ....................... | G06V 30/414 |
| 2022/0284724 A1* | 9/2022 | Schwiebert | .......... | G06V 30/416 |
| 2022/0398790 A1* | 12/2022 | Arora | ..................... | G06T 11/60 |
| 2023/0234235 A1* | 7/2023 | Szarzynski | .......... | B25J 11/0005 |
| | | | | 345/468 |

* cited by examiner

300A

Bounding Box

Right-Side
Bearing

R

Baseline

Glyph Width

Left-Side
Bearing

Glyph Origin
{x , y}

L

L = Left Position = Glyph Origin = { x , y }

R = Right Position = { x + Left-Side Bearing + Glyph Width + Right-Side Bearing, y }

300B

Broken text

300C

Merging with kern = 0

300D

Merging with Auto kerning

300E

Original Glyph gaps

Auto kerned glyph gaps

Real glyph space to regenerate

300F

Real Glyph gaps = [100, 100, 100]
Tracking = 100 units

300G 10      10      10    40          40          40          40

Tracking series = 10 units      Tracking series = 40 units

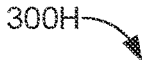
Real Glyph gaps = [95, 100, 108]
Font size = 50pts
Dynamic Tolerance = 50/5 = 10 units
Real Glyph gaps = [9, 10, 11]
Font size = 10pts
Dynamic Tolerance = 10/5 = 2 units
*FIG. 3H*
Dynamic tolerance = 2 units
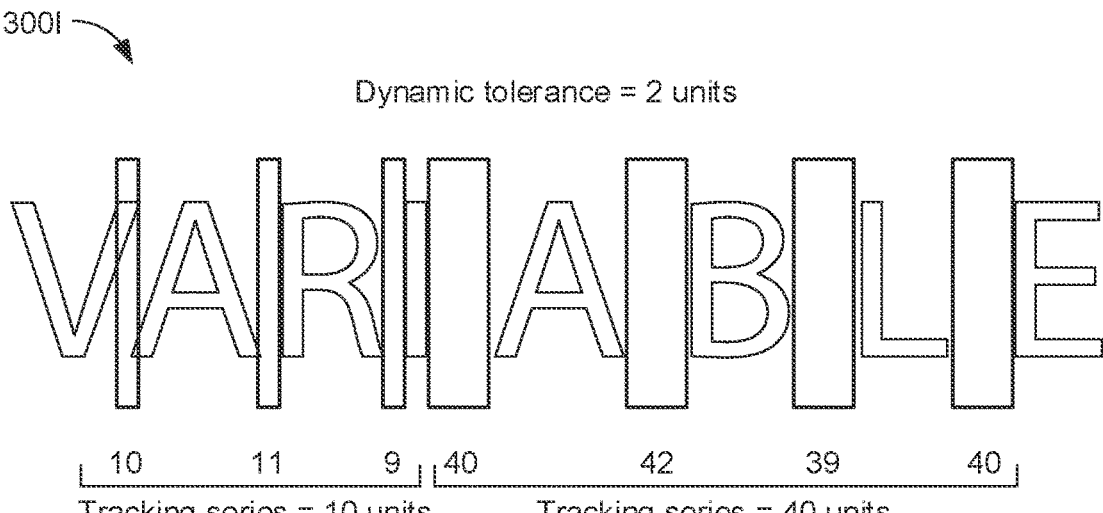
| 10 | 11 | 9 | 40 | 42 | 39 | 40 |
Tracking series = 10 units     Tracking series = 40 units
*FIG. 3I*

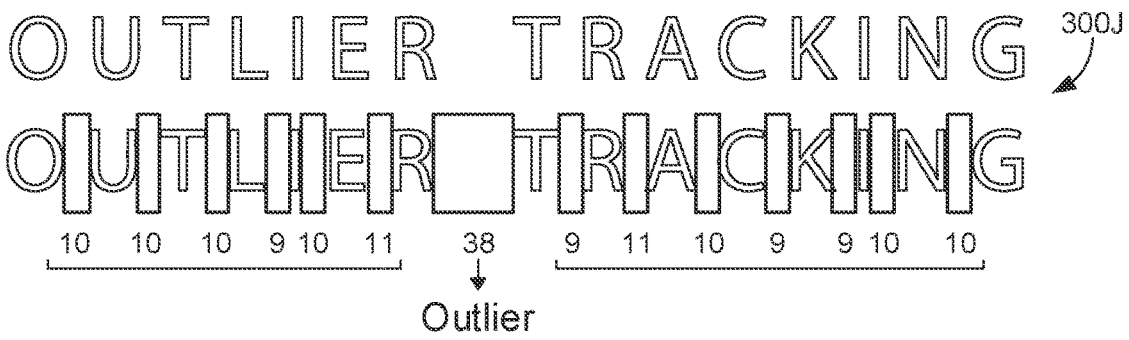
Outlier
FIG. 3J
Tracking series = 10 units
|  | 10 | 10 | 10 | 9 | 10 | 11 | 38 | 9 | 11 | 10 | 9 | 9 | 10 | 10 |
|---|---|---|---|---|---|---|---|---|---|---|---|---|---|---|
| − | 10 | 10 | 10 | 10 | 10 | 10 |  | 10 | 10 | 11 | 10 | 10 | 10 | 10 | 10 |
Remaining gaps = 0　0　0　-1　0　1　28　-1　0　0　-1　-1　0　10
FIG. 3K
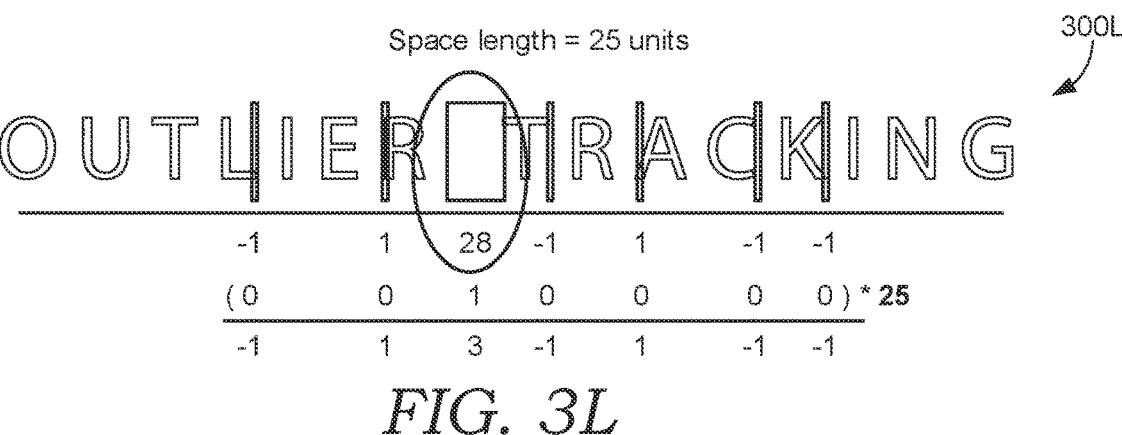
Space length = 25 units
-1　1　28　-1　1　-1　-1
( 0　0　1　0　0　0　0 ) * 25
-1　1　3　-1　1　-1　-1
FIG. 3L
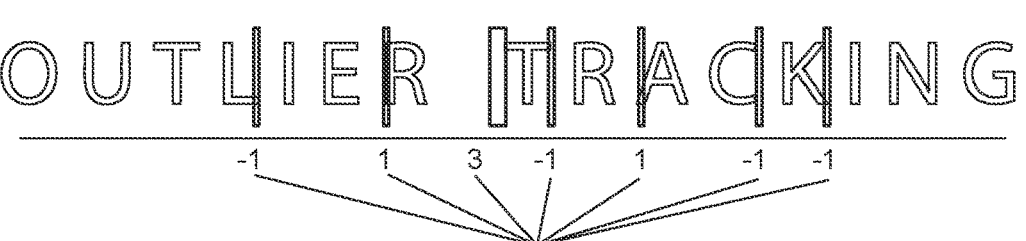
-1　1　3　-1　1　-1　-1
Apply remaining gaps as custom kerning values
FIG. 3M

500

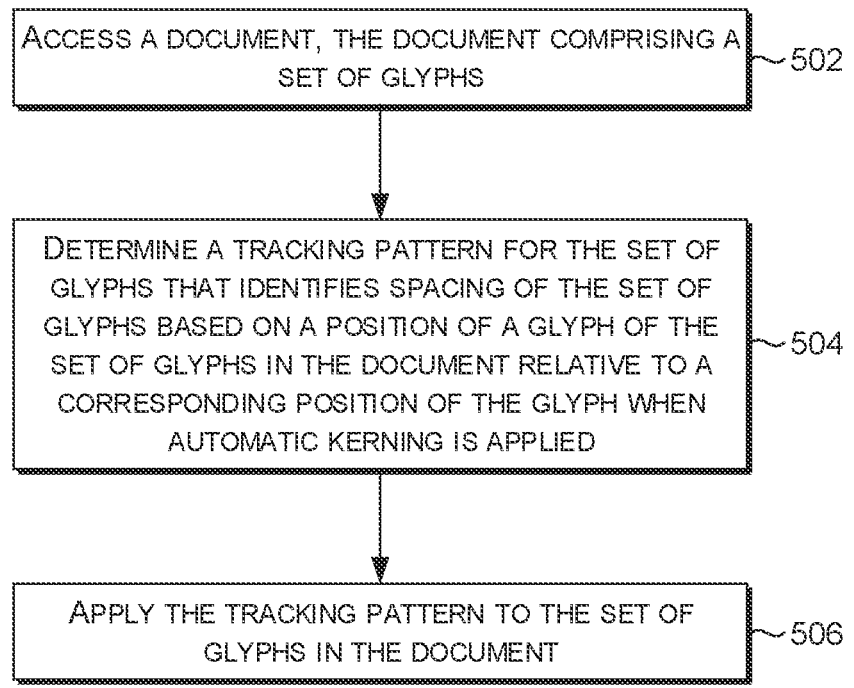

ACCESS A DOCUMENT, THE DOCUMENT COMPRISING A SET OF GLYPHS ~502

DETERMINE A TRACKING PATTERN FOR THE SET OF GLYPHS THAT IDENTIFIES SPACING OF THE SET OF GLYPHS BASED ON A POSITION OF A GLYPH OF THE SET OF GLYPHS IN THE DOCUMENT RELATIVE TO A CORRESPONDING POSITION OF THE GLYPH WHEN AUTOMATIC KERNING IS APPLIED ~504

APPLY THE TRACKING PATTERN TO THE SET OF GLYPHS IN THE DOCUMENT ~506

*FIG. 5*

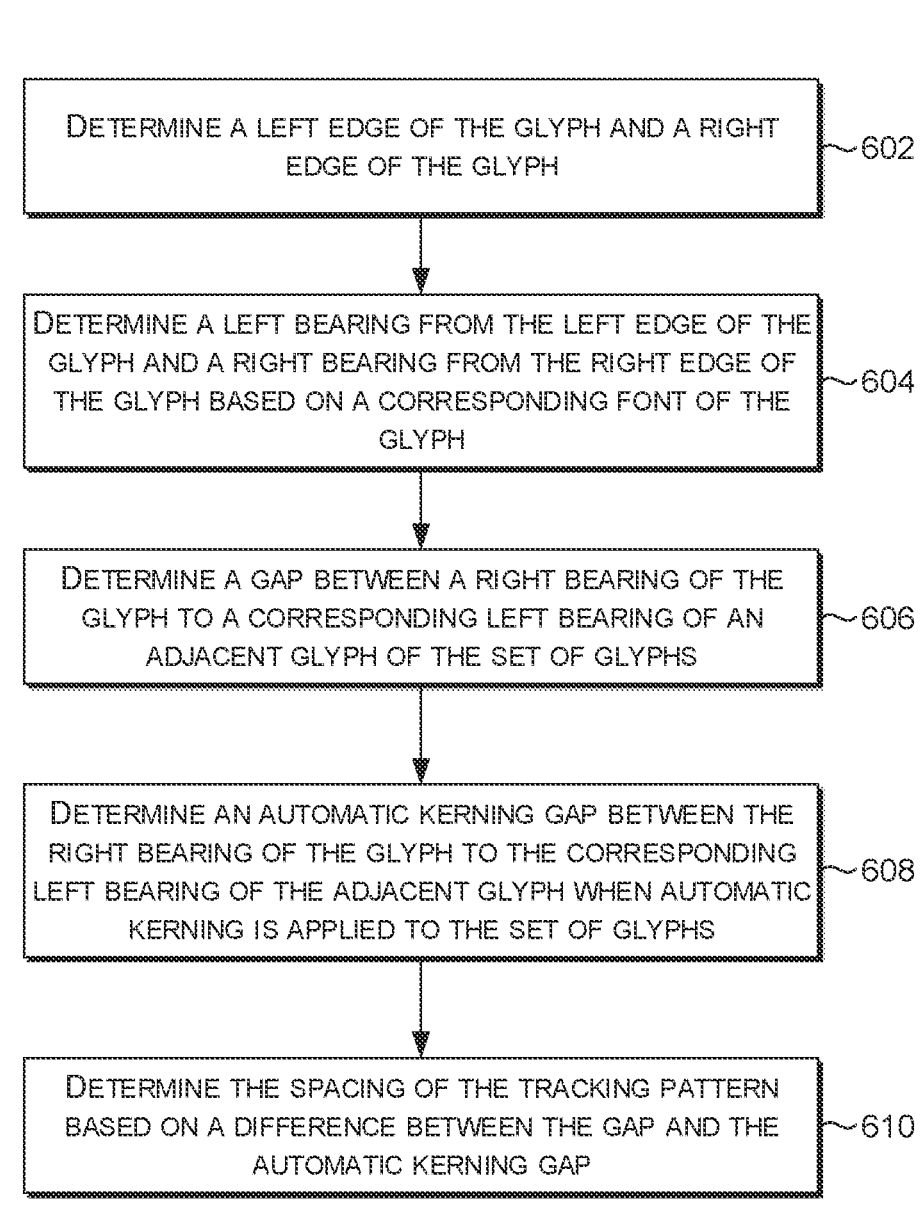

600

DETERMINE A LEFT EDGE OF THE GLYPH AND A RIGHT EDGE OF THE GLYPH ~602

DETERMINE A LEFT BEARING FROM THE LEFT EDGE OF THE GLYPH AND A RIGHT BEARING FROM THE RIGHT EDGE OF THE GLYPH BASED ON A CORRESPONDING FONT OF THE GLYPH ~604

DETERMINE A GAP BETWEEN A RIGHT BEARING OF THE GLYPH TO A CORRESPONDING LEFT BEARING OF AN ADJACENT GLYPH OF THE SET OF GLYPHS ~606

DETERMINE AN AUTOMATIC KERNING GAP BETWEEN THE RIGHT BEARING OF THE GLYPH TO THE CORRESPONDING LEFT BEARING OF THE ADJACENT GLYPH WHEN AUTOMATIC KERNING IS APPLIED TO THE SET OF GLYPHS ~608

DETERMINE THE SPACING OF THE TRACKING PATTERN BASED ON A DIFFERENCE BETWEEN THE GAP AND THE AUTOMATIC KERNING GAP ~610

*FIG. 6*

AUTOMATED RECONSTRUCTION OF GLYPH SPACING PROPERTIES

BACKGROUND

Oftentimes, a user will export a document into a non-native format, such as when a user of design or word processing application exports a design document into Scalable Vector Graphics format (SVG) or Portable Document Format (PDF). In some instances, due to the change in the format of the document, the text objects in the original document are broken into smaller portions to preserve the layout. As the text objects are broken into smaller portions, a user cannot search and/or replace words that are broken into the smaller portions.

SUMMARY

Various aspects of the technology described herein are generally directed to systems, methods, and computer storage media for, among other things, automated reconstruction of glyph spacing properties. In this regard, embodiments described herein facilitate text reconstruction that determines the custom tracking and kerning properties applied to a document so that the document can be searched and/or edited. For example, a tracking pattern for a set of glyphs in a document can be determined based on the difference between actual gaps between the glyphs in the document and computed gaps between the glyphs when automatic kerning is applied. When there is a change in a tracking pattern above a threshold tolerance (e.g., a gap of a greater distance than the gap between characters of the tracking pattern), the algorithm determines whether to apply a new tracking pattern or insert a space character. For example, if a subsequent gap after the change in the tracking pattern returns to the original tracking pattern, a space character is inserted between the glyphs. Alternatively, if the subsequent gap after the change in the tracking pattern is within a threshold tolerance of the new gap corresponding to the change, a new tracking pattern is applied to the glyphs without inserting a space character. When there is a change in a tracking pattern below a threshold tolerance, the algorithm can apply a custom kerning value to the character. In this regard, the glyph spacing properties can be applied to the text of the document to allow a user to search for words that would otherwise be represented as broken text and unsearchable and/or apply the glyph spacing properties to a corresponding text object when the user edits the document.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3H provides an example diagram of applying tracking utilizing a dynamic tolerance to a set of glyphs corresponding to the set of glyphs from FIG. 3F, in accordance with embodiments of the present disclosure.

FIG. 3I provides an example diagram of applying tracking utilizing a dynamic tolerance to a set of glyphs corresponding to the set of glyphs from FIG. 3G, in accordance with embodiments of the present disclosure.

FIG. 3J provides an example diagram of determining a location for a space character for a set of glyphs after determining the tracking pattern of the set of glyphs, in accordance with embodiments of the present disclosure.

FIG. 3K provides an example diagram of determining a location for a space character for the set of glyphs of FIG. 3J, in accordance with embodiments of the present disclosure.

FIG. 3L provides an example diagram of applying a space character to the set of glyphs of FIG. 3J, in accordance with embodiments of the present disclosure.

FIG. 3M provides an example diagram of applying a custom kerning parameter to glyphs in the set of glyphs of FIG. 3J, in accordance with embodiments of the present disclosure.

FIG. 5 is a process flow showing a method for automated reconstruction of glyph spacing properties, in accordance with embodiments of the present disclosure.

FIG. 6 is a process flow showing a method for determining the tracking pattern for automated reconstruction of glyph spacing properties, in accordance with embodiments of the present disclosure.

DETAILED DESCRIPTION

Figure 1:
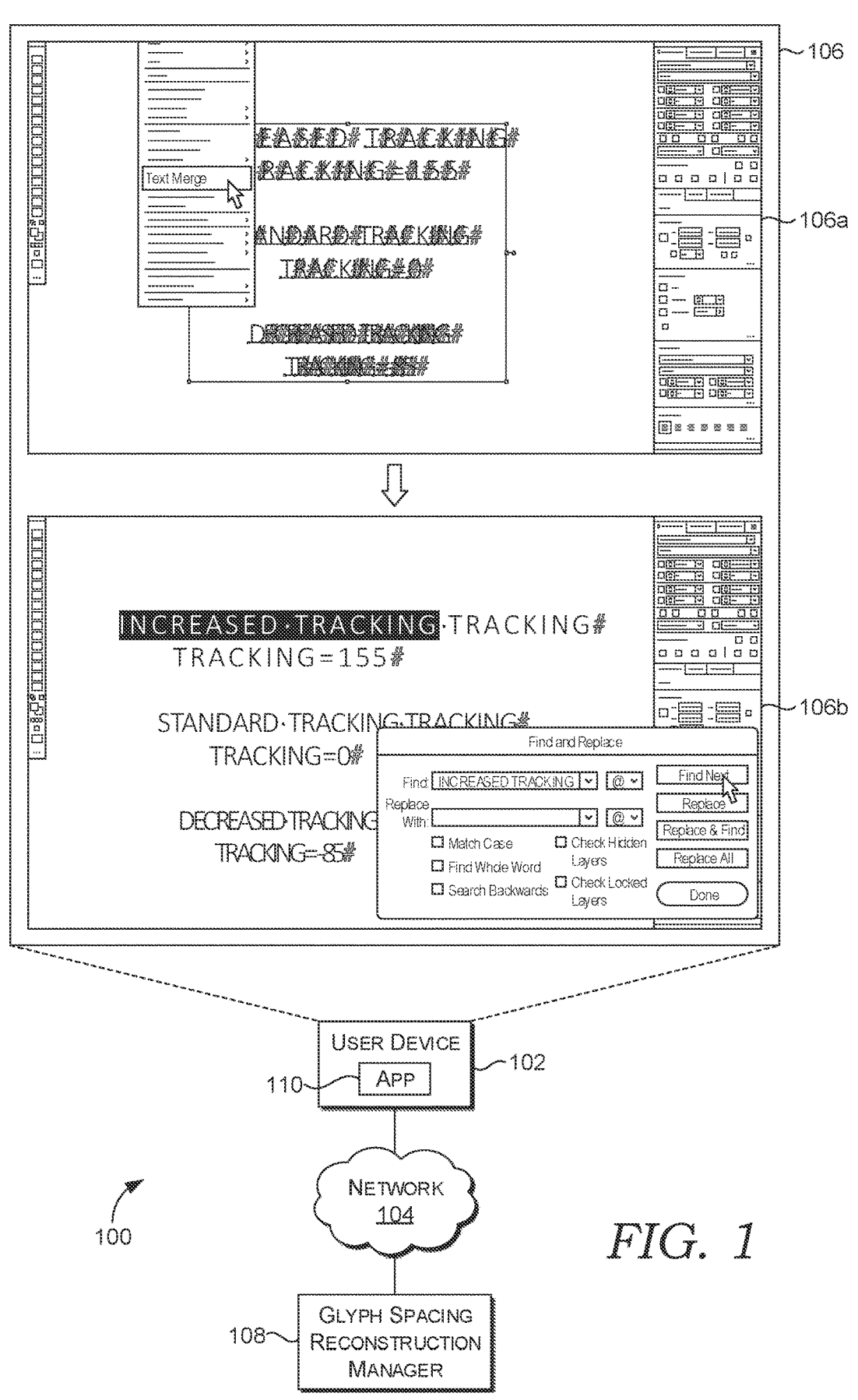
FIG. 1 depicts a diagram of an environment in which one or more embodiments of the present disclosure can be practiced, in accordance with various embodiments of the present disclosure.

Oftentimes, a user will export a document into a non-native format, such as when a user of design or word processing application exports a design document into Scalable Vector Graphics format (SVG) or Portable Document Format (PDF). In some instances, due to the change in the format of the document, the text objects in the original document are broken into smaller portions to preserve the layout. As the text objects are broken into smaller portions, a user cannot search and/or replace words that are broken into the smaller portions.

In previous text reconstruction techniques, some text properties of the original document will not be reconstructed resulting in problems in the reconstructed text objects. For example, words that include increased spacing between letters may be reconstructed with space characters placed in between each of the letters. Due to the addition of space characters, a user will still not be able to search and/or replace words of the reconstructed text objects. As a more specific example, a word, such as "tracking," will include space characters, and be represented in the non-native format as "t r a c k i n g." As such, a search for "tracking" will not yield all of the results that are present in the original format of document as the reconstructed text object in the non-native format includes "t r a c k i n g" in its place. Currently, in order to fix the document exported in the non-native format in conventional implementations, a user will need to manually insert new text objects with the desired spacing based on the specific spacing properties of the text in each text object. Further, in order to fix the document exported in the non-native format following text reconstruction through previous text reconstruction techniques, a user will need to manually edit and/or adjust the spacing of each reconstructed text object based on the specific spacing properties of the text in each text object.

Accordingly, unnecessary computing resources are utilized to manually fix a document exported in the non-native format in conventional implementations. For example, computing and network resources are unnecessarily consumed to facilitate manual insertion of new text objects with the desired spacing and/or the manual adjusting of the spacing upon reconstruction of each text object based on the specific spacing properties of the text in each text object. For instance, computer input/output operations are unnecessarily increased to manually insert new text objects with the desired spacing and/or manually adjust the spacing upon reconstruction of each text object. Further, when the document exported in the non-native format is located in a disk array, there is unnecessary wear placed on the read/write head of the disk of the disk array each time the information related to the document is accessed and/or manually edited. Even further, the processing of operations to manually fix the document exported in the non-native format decreases the throughput for a network, increases the network latency, and increases packet generation costs when the document is located over a network.

As such, embodiments of the present disclosure are directed to automated reconstruction of glyph spacing properties in an efficient and effective manner. In this regard, the automated reconstruction of glyph spacing properties can be efficiently and effectively utilized to reconstruct the text objects of a document exported in a non-native format based on the specific spacing properties of the text in each text object.

Generally, and at a high level, embodiments described herein facilitate automated reconstruction of glyph spacing properties. In this regard, embodiments described herein facilitate text reconstruction that determines the custom tracking and kerning properties applied to a document so that the document can be searched and/or edited. For example, a tracking pattern for a set of glyphs in a document can be determined based on the difference between actual gaps between the glyphs in the document and computed gaps between the glyphs when automatic kerning is applied. When there is a change in a tracking pattern above a threshold tolerance (e.g., a gap of a greater distance than the gap between characters of the tracking pattern), the algorithm determines whether to apply a new tracking pattern or insert a space character. For example, if a subsequent gap after the change in the tracking pattern returns to the original tracking pattern, a space character is inserted between the glyphs. Alternatively, if the subsequent gap after the change in the tracking pattern is within a threshold tolerance of the new gap corresponding to the change, a new tracking pattern is applied to the glyphs without inserting a space character. When there is a change in a tracking pattern below a threshold tolerance, the algorithm can apply a custom kerning value to the character. In this regard, the glyph spacing properties can be applied to the text of the document to allow a user to search for words that would otherwise be represented as broken text and unsearchable and/or apply the glyph spacing properties to a corresponding text object when the user edits the document.

Figure 4A:
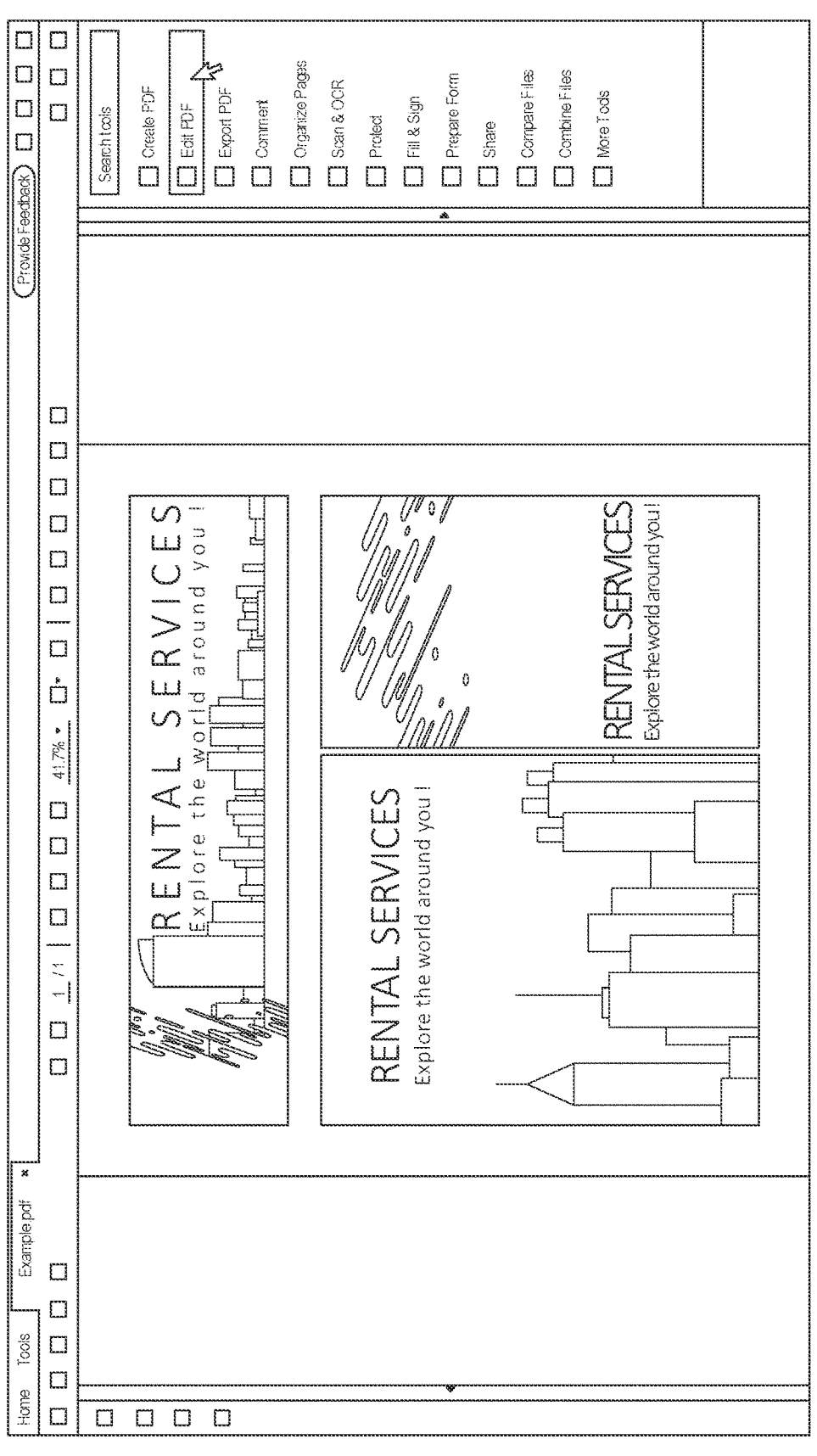
FIG. 4A provides an exemplary schematic screenshot from a personal computing device showing aspects of an example user interface (UI) with an example document, in accordance with embodiments of the present disclosure.

In operation, a document with text is exported from an original format into a non-native format. For example, a user of design application (e.g., Adobe Illustrator®) or word processing application (e.g., Microsoft® Word) exports a document into SVG or PDF. An example of a document with text exported from an original format (e.g., Adobe Illustrator® format) into a non-native format (e.g., PDF) is shown in UI 400A of FIG. 4A.

In order to preserve the layout in the non-native format, the text of the document in the original format is broken into smaller portions in the non-native format. A "text object" typically refers to a unit or structure in a programming context that represents and manipulates text. An example of a document with text objects broken into smaller portions corresponding to each of the individual glyphs of the original text objects is shown in UI 106A of FIG. 1 and UI 400C of FIG. 4C. As can be understood from UI 106A of FIG. 1 and UI 400C of FIG. 4C, the hash characters are hidden glyphs that indicate an end of text marker. A "glyph" is a graphical representation of a specific design of a character, such as a character represented in a specific font. A "character" refers to a symbol representing a letter, number, punctuation mark, and/or other symbols.

Upon reconstruction of the text object with positive tracking from the original format, additional space characters are provided after each end of text marker in the non-native format as the previous reconstruction technique cannot account for the positive tracking of the text object. A "space character" refers to a space in punctuation corresponding to a blank area that separates words or sentences. "Tracking" refers to the uniform adjustment of spacing for a group of glyphs. In this regard, positive tracking increases the overall spacing between characters, while negative tracking decreases overall spacing between characters. Similarly, upon reconstruction of the text object with negative tracking from the original format, space characters are removed after the end of text marker of certain text elements (e.g., the space character between "decreased" and "tracking" is removed in UI 106A of FIG. 1) as the reconstruction technique cannot account for the negative tracking of the text object.

Figure 4B:
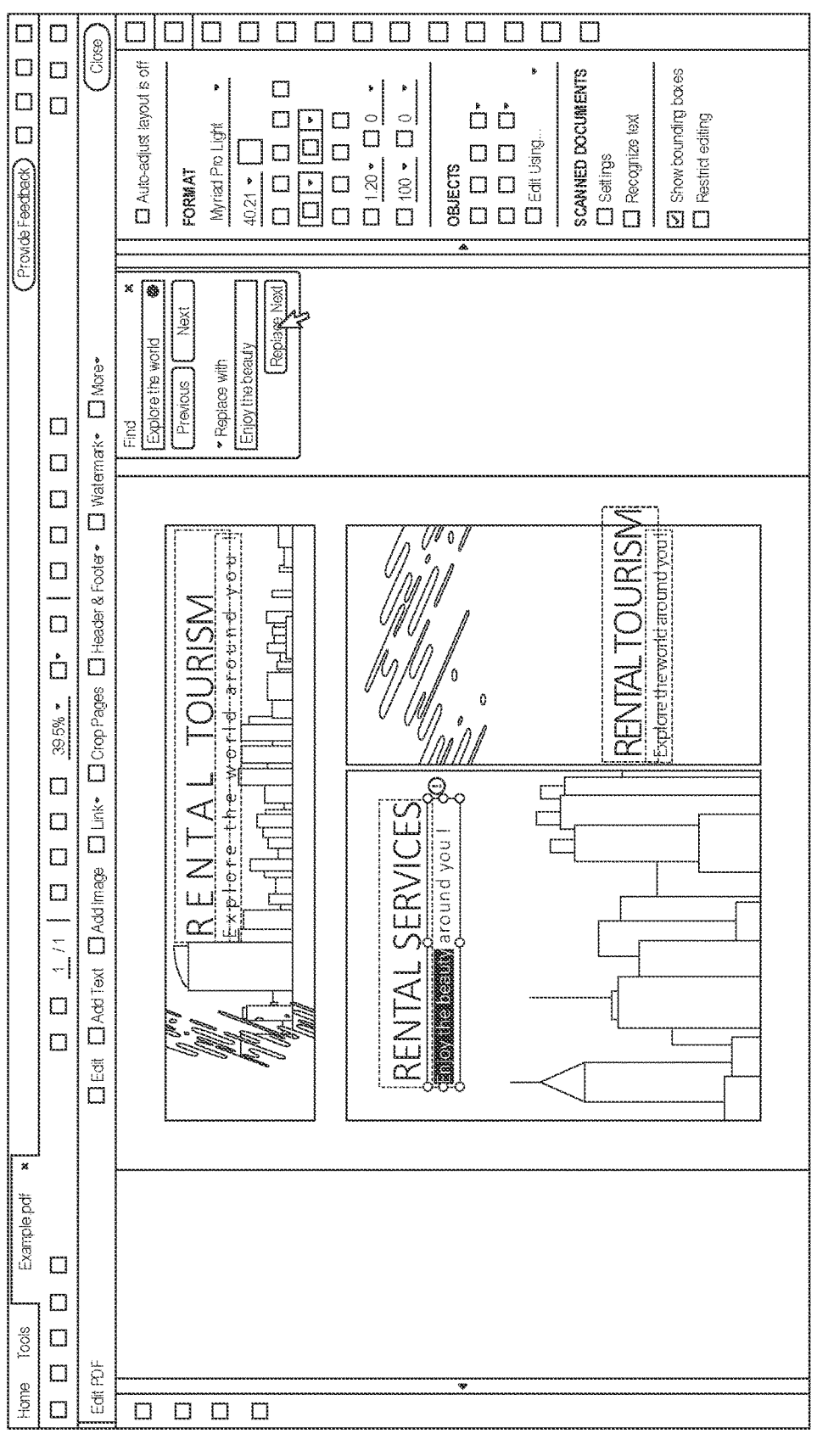
FIG. 4B provides an exemplary schematic screenshot from a personal computing device showing aspects of an example UI with the example document of FIG. 4A showing aspects of the text objects of the document before applying automated reconstruction of glyph spacing properties, in accordance with embodiments of the present disclosure.

As the previous reconstruction technique cannot account for the glyph spacing properties of the text objects of the original format, the text will not be searchable and edits will not reflect the glyph spacing properties of the corresponding text object. An example of the text not being searchable is shown in UI 400B of FIG. 4B. As can be understood from FIG. 4B, when a user searches for "explore the world" to replace "explore the world" with "explore the beauty," the text object in the topmost design reconstructed as "e x p l o r e t h e w o r l d" is not found. An example of edits not reflecting the glyph spacing properties of the corresponding text object is also shown in UI 400B of FIG. 4B. As can be understood from FIG. 4B, when a user edits "RENTAL SERVICES" in the topmost design to be "RENTAL TOURISM," the glyph spacing properties of the text object of the original format is not applied to the edited text.

In this regard, embodiments described herein facilitate text reconstruction of text broken into smaller portions following exporting of the document from an original format to the non-native format that determines the glyph spacing properties of the text, such as the tracking and kerning properties of the text and the corresponding space characters of the text. "Kerning" refers to the adjustment of space between individual pairs of glyphs as opposed to "tracking," which refers to the spacing between a set of glyphs, such as a group of glyphs or a block of text. An example of interaction element (e.g., "text merge") of a drop down menu in which a user implements the text reconstruction that determines the tracking and kerning properties of the text is shown in UI 106A of FIG. 1 and UI 400C of FIG. 4C.

In embodiments, in order to determine the glyph spacing properties of the text, the position of each glyph, including the left position and right position of each glyph, are determined. In some embodiments, the character, font, horizontal scaling, and/or vertical scaling of the glyph can be accessed and/or determined. For example, optical character recognition and/or font detection algorithm can be utilized to determine the character, font, horizontal scaling, and/or vertical scaling of each glyph. As another example, the character, font, horizontal scaling, and/or vertical scaling of the glyph can be accessed from metadata of the original document and/or exported document.

Figure 3A:
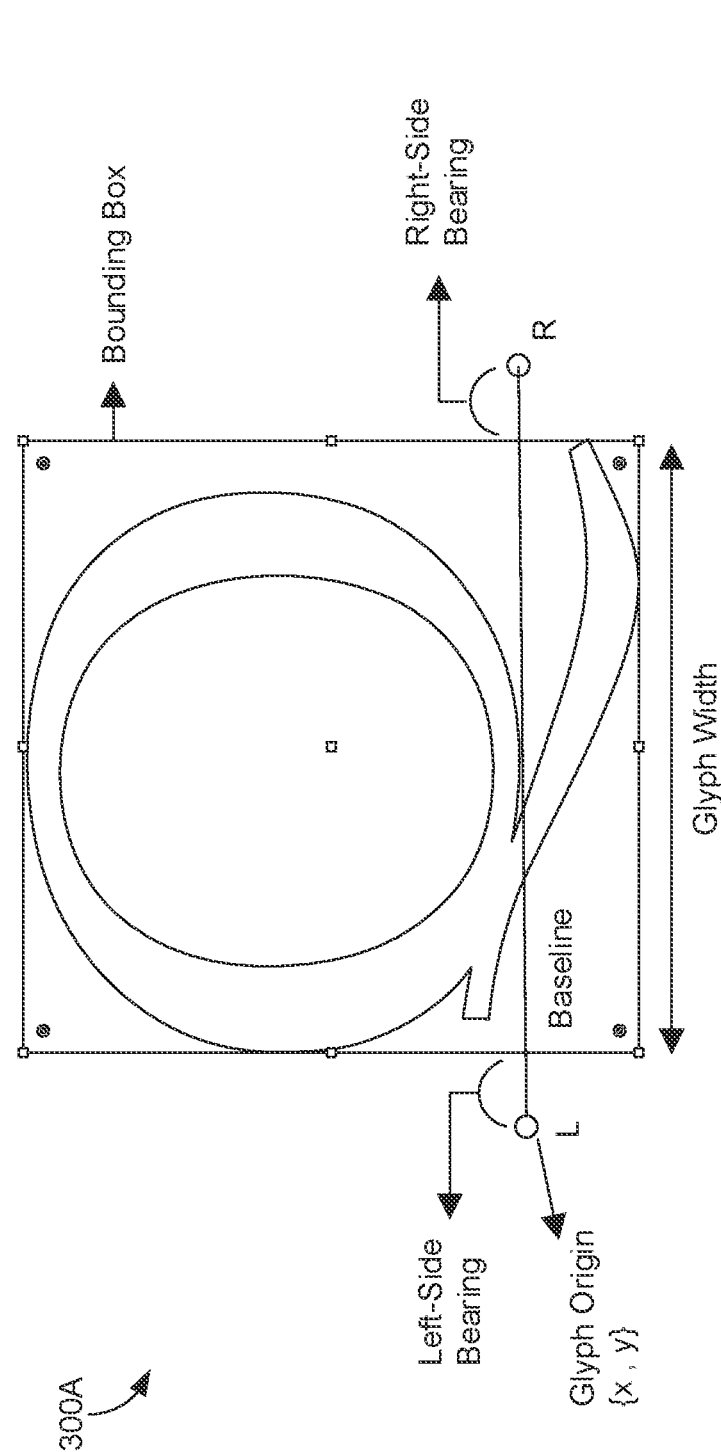
FIG. 3A provides an example diagram of determining glyph position, in accordance with embodiments of the present disclosure.

An example of determining the position of each glyph, including the left position and right position of each glyph, is shown at FIG. 3A. As can be understood from diagram 300A of FIG. 3A, the left position and right position can be determined based on the real space of each glyph. "Real space" refers to the space that the glyph occupies, including the bearings defined for the glyph. "Bearing" refers to the space around a glyph defined for a specific glyph (e.g., each left bearing and right bearing can be defined differently for each character of each font by a font designer). As shown in FIG. 3A, the left position of the glyph can be determined based on the left edge of the glyph and the left bearing of the glyph based on the character and font of the glyph. In some embodiments, the left position of the glyph is referred to as the glyph origin. The right position of the glyph can be determined based on the right edge of the glyph and the right bearing of the glyph based on the character and font of the glyph. A bounding box of the glyph can be determined based on the left edge, right edge, top edge, bottom edge, and/or the bearings of the glyph. In some embodiments, the bounding box can be used to determine the horizontal scaling, and/or vertical scaling of the glyph.

Figures 3B, 3C, 3D, 3E:
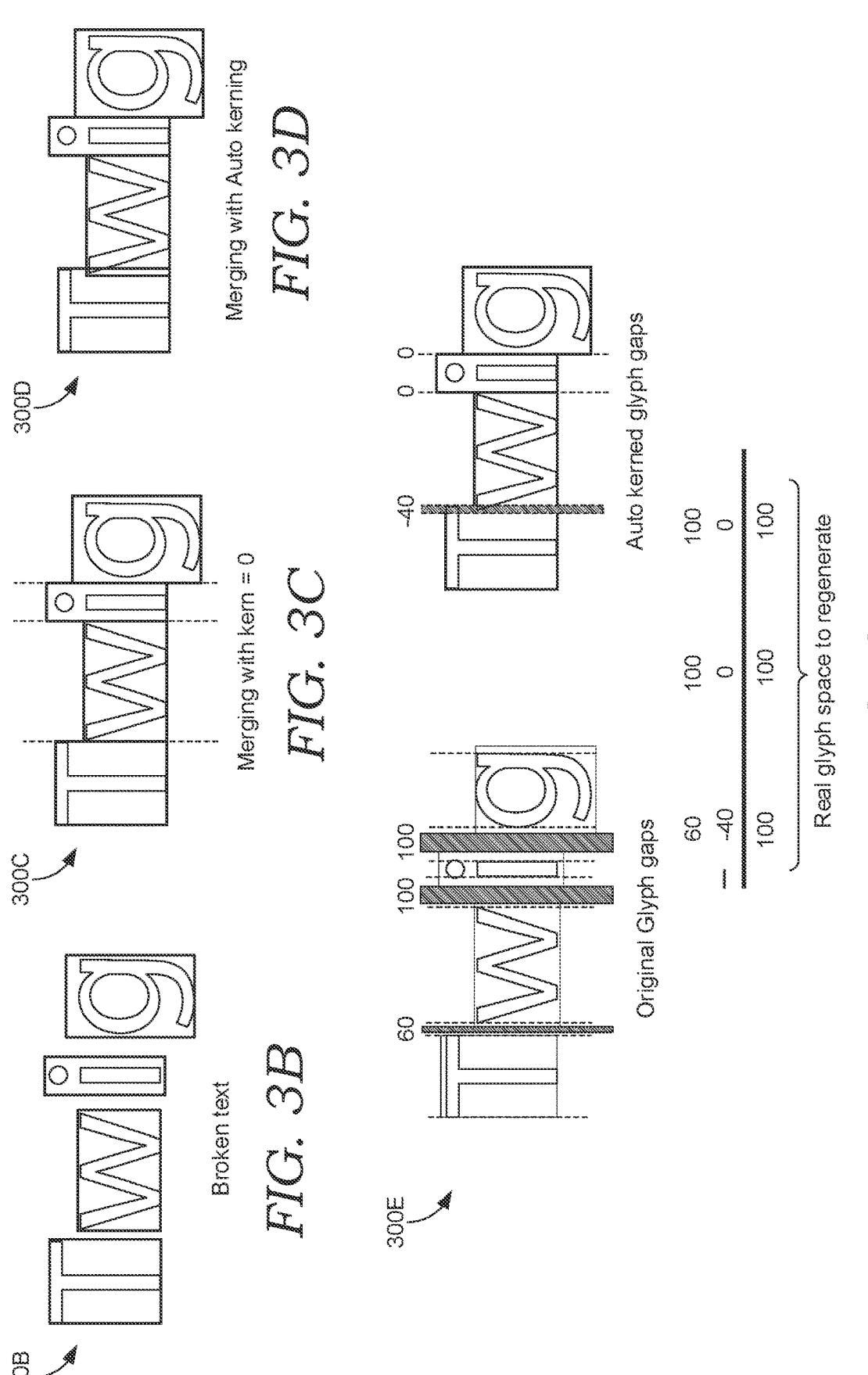
FIG. 3B provides an example diagram of determining glyph position for a set of glyphs, in accordance with embodiments of the present disclosure.
FIG. 3C provides an example diagram of determining glyph position for the set of glyphs of FIG. 3B with kerning set to zero, in accordance with embodiments of the present disclosure.
FIG. 3D provides an example diagram of determining glyph position for the set of glyphs of FIG. 3B with automatic kerning applied, in accordance with embodiments of the present disclosure.
FIG. 3E provides an example diagram of determining spacing of the set of glyphs of FIG. 3B with respect to the set of glyphs of FIG. 3D with automatic kerning applied, in accordance with embodiments of the present disclosure.

In embodiments, the distance between each glyph is determined based on the distance between the positions of each adjacent glyph. For example, the distance of the gap between the right position (e.g., the right bearing) of each glyph to a corresponding left position (e.g., the left bearing) of the left adjacent glyph is determined. An example of determining the distance between each glyph based on the distance the position of each adjacent glyph is shown at FIGS. 3B and 3E. As can be understood from diagram 300B of FIG. 3B, the left position and right position of each glyph are determined as shown by the corresponding bounding boxes of each glyph (e.g., where the bounding boxes include the bearings of each glyph). In diagram 300E of FIG. 3E, the distance between the left position of the first glyph "T" to the right position of the second glyph "w" is 60 units. The distance between the left position of the second glyph "w" to the right position of the third glyph "i" is 100 units. The distance between the left position of the third glyph "i" to the right position of the fourth glyph "g" is 100 units.

In embodiments, automatic kerning is applied to the glyphs. In this regard, the distance between each glyph can be determined when automatic kerning is applied to the glyphs. "Automatic kerning" refers to the automatic adjustment of spacing between characters as implemented by the font designer between each individual pairs of glyphs of a specific font (e.g., the spacing between the letters "a" and "e" in Times New Roman). For example, the distance of the gap between the right position (e.g., the right bearing) of each glyph to a corresponding left position (e.g., the left bearing) of the left adjacent glyph is determined when automatic kerning is applied to the glyphs. An example of applying kerning set to zero is shown in diagram 300C of FIG. 3C. An example of determining the distance between each glyph when automatic kerning is applied to the glyphs is shown at FIGS. 3D and 3E. As can be understood from diagram 300D of FIG. 3D, left position and right position of each glyph is determined when automatic kerning is applied to the glyphs as shown by the corresponding bounding boxes of each glyph. In diagram 300E of FIG. 3E, the distance between the left position of the first glyph "T" to the right position of the second glyph "w" is −40 units. The distance between the left position of the second glyph "w" to the right position of the third glyph "i" is 0 units. The distance between the left position of the third glyph "i" to the right position of the fourth glyph "g" is 0 units.

In embodiments, the distance between each glyph is determined based on the difference between the original distance between each glyph and the distance between each glyph when automatic kerning is applied. An example of determining the distance between each glyph based on the difference between the original distance between each glyph and the distance between each glyph when automatic kerning is applied is shown at FIG. 3E. As can be understood from diagram 300E of FIG. 3E, the distance between the left position of the first glyph "T" to the right position of the second glyph "w" is determined to be 100 units. The distance between the left position of the second glyph "w" to the right position of the third glyph "i" is determined to be 100 units. The distance between the left position of the third glyph "i" to the right position of the fourth glyph "g" is determined to be 100 units.

Figure 3F:
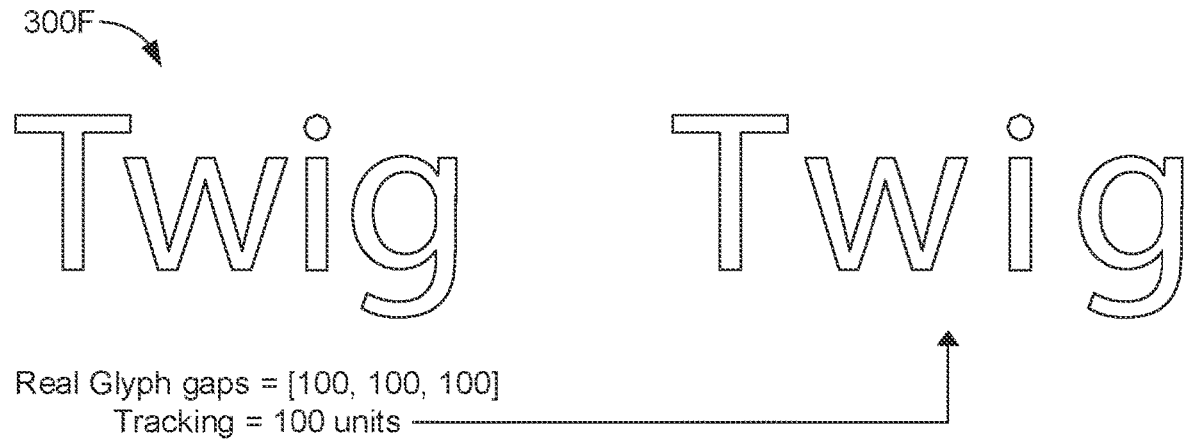
FIG. 3F provides an example diagram of applying the tracking to the set of glyphs of FIG. 3B as determined in FIG. 3E, in accordance with embodiments of the present disclosure.

In embodiments, a tracking pattern corresponding to the spacing of the set of glyphs can be determined based on the difference between the original distance between each glyph and the distance between each glyph when automatic kerning is applied. The tracking pattern can then be applied to the text object after applying automatic kerning to the text object in order to reconstruct the glyph spacing properties of the text object. An example of applying the tracking pattern (e.g., as determined based on the spacing computing in FIG. 3E) is shown at FIG. 3F. As can be understood from diagram 300F of FIG. 3F, the spacing of "100" units is applied to the glyph with automatic kerning applied in order to facilitate reconstruction of the glyph spacing properties of the text from the original document.

Figure 3G:
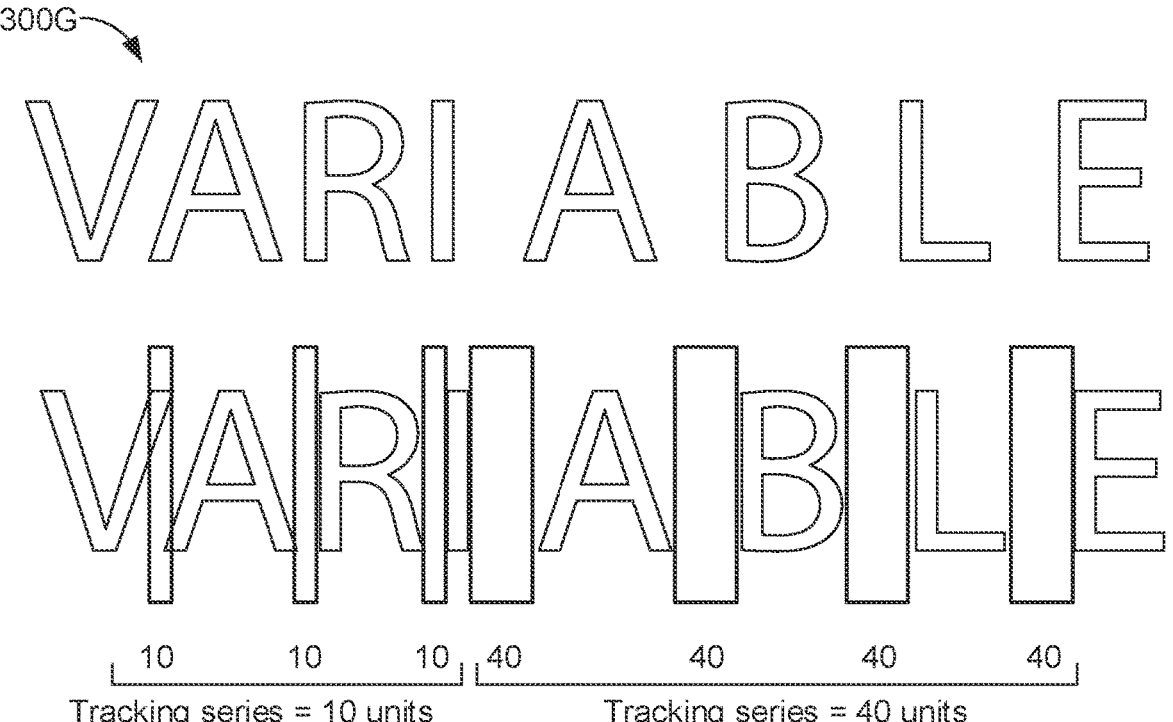
FIG. 3G provides an example diagram of applying tracking to a set of glyphs with multiple patterns, in accordance with embodiments of the present disclosure.

In some embodiments, the gaps (e.g., distances between each successive glyph) between glyphs can be computed sequentially based on the next successive glyph in each text object of the document in order to determine whether to maintain the tracking pattern and/or implement a new tracking pattern for the text object. In some embodiments, the text object may include multiple tracking patterns. For example, as shown in diagram 300G of FIG. 3G, a text object includes a word with a first tracking pattern corresponding to a spacing of 10 units and a second tracking pattern corresponding to a spacing of 40 units. In this regard, each tracking pattern can be ended when a new tracking pattern is encountered at the next successive glyph.

In some embodiments, each tracking pattern can include a tolerance to determine whether the tracking pattern is continuous for a set of glyphs. For example, gaps may include slight deflections from actual values due to custom kerning parameters, text recognition precision issues, and/or issues due to saving the document in non-native formats. In some embodiments, the tolerance of the tracking pattern is dynamic in that the tolerance is compared to an average of each gap between each successive glyph of the corresponding tracking pattern. In some embodiments, the tolerance and/or dynamic tolerance is based on the font size. For example, the tolerance and/or dynamic tolerance can be based on the font size divided by 5. In some embodiments, for example with respect to tracking patterns with negative tracking, the tolerance and/or dynamic tolerance is compared with the absolute value of the average of each gap between each successive glyph of the corresponding tracking pattern.

Examples of computing the tracking pattern based on a dynamic tolerance is shown in FIGS. 3H and 3I. As can be understood from diagram 300H of FIG. 3H, in the first example, the real glyph gaps (e.g., the distance between each glyph determined based on the difference between the original distance between each glyph and the distance between each glyph when automatic kerning is applied) between each successive glyph is 95 units, 100 units, and 108 units. The font size of the glyphs is 50 points. The dynamic tolerance is computed as font size divided by 5, which equals 10 units. In this regard, the second real glyph gap of 100 units is within (e.g., less than and/or less than or equal) 10 units (e.g., the tolerance) of 97.5 units (e.g., the average of 95 units of the first real glyph gap and 100 units of the second real glyph gap). The third real glyph gap of 108 units is within 10 units (e.g., the tolerance) of 101 units (e.g., the average of 95 units of the first real glyph gap, 100 units of the second real glyph gap, and 108 units of the third real glyph gap). The tracking pattern is the average of the real glyph gaps (e.g., 101 units). The difference between the real glyph gap and the tracking pattern can be adjusted with a custom kerning parameter for a corresponding glyph.

In the second example of diagram 300H of FIG. 3H, the real glyph gaps between each successive glyph is 9 units, 10 units, and 11 units. The font size of the glyphs is 10 points. The dynamic tolerance is computed as font size divided by 5, which equals 2 units. In this regard, the second real glyph gap of 10 units is within 2 units (e.g., the tolerance) of 9.5 units (e.g., the average of 9 units of the first real glyph gap and 10 units of the second real glyph gap). The third real glyph gap of 11 units is within 2 units (e.g., the tolerance) of 2 units (e.g., the average of 9 units of the first real glyph gap, 10 units of the second real glyph gap, and 11 units of the third real glyph gap). The tracking pattern is the average of the real glyph gaps (e.g., 10 units). The difference between the real glyph gap and the tracking pattern can be adjusted with a custom kerning parameter for a corresponding glyph.

As can be understood from diagram 300I of FIG. 3I, the real glyph gaps of the first tracking series (e.g., tracking pattern) of 10 units are within the dynamic tolerance of 2 units. However, the real glyph gap between the fourth glyph and the fifth glyph of 40 units is not within the dynamic tolerance of 2 units to the 10 unit tracking series. Therefore, the first tracking series of 10 units is ended and a second tracking series begins between the fourth glyph and the fifth glyph.

In some embodiments, when real glyph gaps are close to zero (e.g., real glyph gaps of a tracking series are 0.2, 0, 0.1, −0.1, 0, 0.03 are within a threshold tolerance with respect to 0 units), no tracking pattern is applied to the glyphs. In some embodiments, no tracking pattern is applied to the glyphs when the glyph gaps are within a threshold tolerance of zero (e.g., close to zero units) and the threshold tolerance with respect to zero is determined based on the font size of the glyphs. In some embodiments, when real glyph gaps are close to zero, each of the glyph gaps can be adjusted with a custom kerning parameter for a corresponding glyph.

In some embodiments, a location of a space character is determined based on a distance between adjacent glyphs that is above a threshold value with respect to the tracking pattern. In this regard, the space character can be inserted into the location between the adjacent glyphs in order to facilitate reconstruction of the text from the original document. In some embodiments, while determining the tracking pattern for a set of glyphs, a real glyph gap above a tolerance of the tracking pattern is determined to be a candidate for a space character only if the next adjacent real glyph gap is within tolerance of the tracking pattern. When the next adjacent real glyph gap is within tolerance of the tracking pattern, the real glyph gap determined to be the candidate for a space character is excluded from the calculation of the average tracking pattern. For example, if the real glyph gaps between each successive glyph is 2 units, 2 units, 2 units, 10 units, 2 units, and 2 units, and the tolerance is 2 units, the fourth real glyph gap of 10 units is determined to be a candidate for a space character as the tracking pattern returns to the original tracking pattern of 2 units at the fifth real glyph gap. In this regard, the fourth real glyph gap of 10 units is excluded from calculation of the average tracking pattern. However, in another example, if the real glyph gaps between each successive glyph is 2 units, 2 units, 2 units, 10 units, 10 units, and 10 units, and the tolerance is 2 units, the fourth real glyph gap of 10 units is not determined to be a candidate for a space character as the tracking pattern does not return to the previous tracking pattern of 10 units. Rather, in this scenario a new tracking pattern of 10 units begins.

Examples of determining a location of a space character based on a distance between adjacent glyphs that is above a threshold value with respect to the tracking pattern is shown in FIGS. 3J, 3K, and 3L. As can be understood from diagram 300J of FIG. 3J and diagram 300K of FIG. 3K, the real glyph gap of 38 units, which is above a tolerance (e.g., for a font size of 12, and a tolerance computed as font size/5, the tolerance can be computed as 2.4) of the 10 unit tracking pattern, is determined to be a candidate for a space character as the prior real glyph gap of 11 units and the subsequent real glyph gap units are within the tolerance of the tracking pattern. As shown in diagram 300K of FIG. 3K, after applying the tracking pattern, the location determined to be a candidate for a space character includes a distance of 28 units.

In this regard, the location determined to be a candidate for a space character can be determined to be the location for a space character based on whether the distance of the gap is greater than and/or equal to a threshold length occupied by the space glyph (e.g., the length of the space character in the corresponding font). In some embodiments, the length occupied by the space glyph is equal to the length of the space glyph plus the length of the spacing of the tracking pattern. In some embodiments, the length of the space glyph can be adjusted to be a kerning adjusted space glyph based on the font size, horizontal scale, and/or vertical scale.

For example, with respect to the example shown in FIGS. 3J-3M, the font of the glyphs is Myriad Pro, the font size is 12 units, the horizontal scale is 100%, and the tracking is determined to be 10 units. If the length of the space glyph is 18 units, the kerning adjusted space glyph can be computed to be 15 units based on the font size, horizontal scale, and/or vertical scale. In this example, as the tracking is determined to be 10 units, length occupied by the space glyph is 25 units.

As can be understood from diagram 300L of FIG. 3L, the location of a space character is determined to be a location for a space character as the distance of 28 units is above a threshold value of 25 units corresponding to the space character length and tracking pattern. Following insertion of the space character, a distance of 3 units remains in the location which can be adjusted with a custom kerning parameter.

In some embodiments, a location of a custom kerning value is determined based on a distance between adjacent glyphs that is below a threshold value with respect to the tracking pattern. In this regard, the custom kerning value can be applied to a corresponding glyph in order to facilitate reconstruction of the glyph spacing properties from the original document. In some embodiments, any negative space (e.g., after applying the average tracking to the glyphs) is automatically filled by a corresponding custom kerning value to a corresponding glyph. In some embodiments, the remaining space filled by custom kerning values is only determined after applying, or determining whether to apply, space characters to locations with enough space to fit a space character.

An example of determining a location of a custom kerning value based on a distance between adjacent glyphs that is below a threshold value with respect to the tracking pattern is shown in FIG. 3M. As can be understood from diagram 300M of FIG. 3M, the locations of custom kerning values are determined as each of the remaining gaps computed in FIG. 3L are negative or below a threshold value for insertion of a space character. In this regard, a custom kerning value of −1 unit is applied to the "L" glyph, a custom kerning value of 1 unit is applied to the "E" glyph, a custom kerning value of 3 units is applied to the space character, a custom kerning value of −1 unit is applied to the "T" glyph, a custom kerning value of 1 unit is applied to the "R" glyph, a custom kerning value of −1 unit is applied to the "C" glyph, and a custom kerning value of −1 unit is applied to the "K" glyph. As such, the text object can be output with the custom tracking and kerning properties applied to the text object in the document so that the document can be searched and/or edited.

In embodiments, the glyph spacing properties can be applied to the text of the document to allow a user to search for words that would otherwise be represented as broken text and unsearchable and/or apply the glyph spacing properties to a corresponding text object when the user edits the document. For example, following text reconstruction with the glyph spacing properties, responsive to a user triggering a search function for a word or a portion thereof, the word can be identified from the reconstructed glyphs. As another example, following text reconstruction with the glyph spacing properties, responsive to a user editing a text object to include new characters, the glyph spacing properties, such as the tracking pattern, can be applied to the new characters in the text object. As another example, following text reconstruction with the glyph spacing properties, responsive to a user triggering find and replace function for a word or a portion thereof with a new word or portion thereof, the word can be identified and replaced from the reconstructed glyphs with the glyph spacing properties, such as the tracking pattern applied to the new word or portion thereof.

Figure 4C:
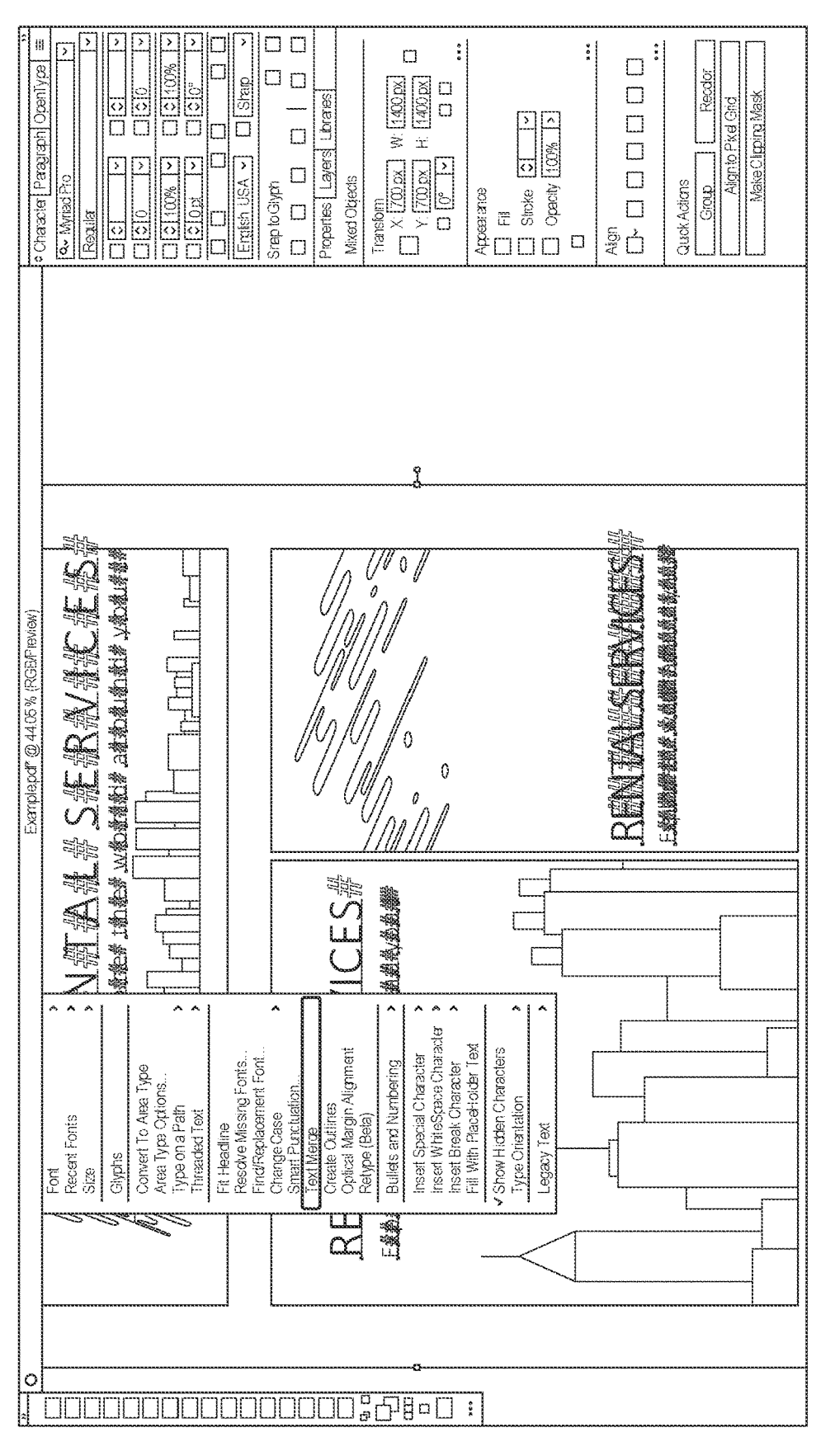
FIG. 4C provides an exemplary schematic screenshot from a personal computing device showing aspects of an example UI to apply automated reconstruction of glyph spacing properties to the document of FIG. 4A, in accordance with embodiments of the present disclosure.
Figure 4D:
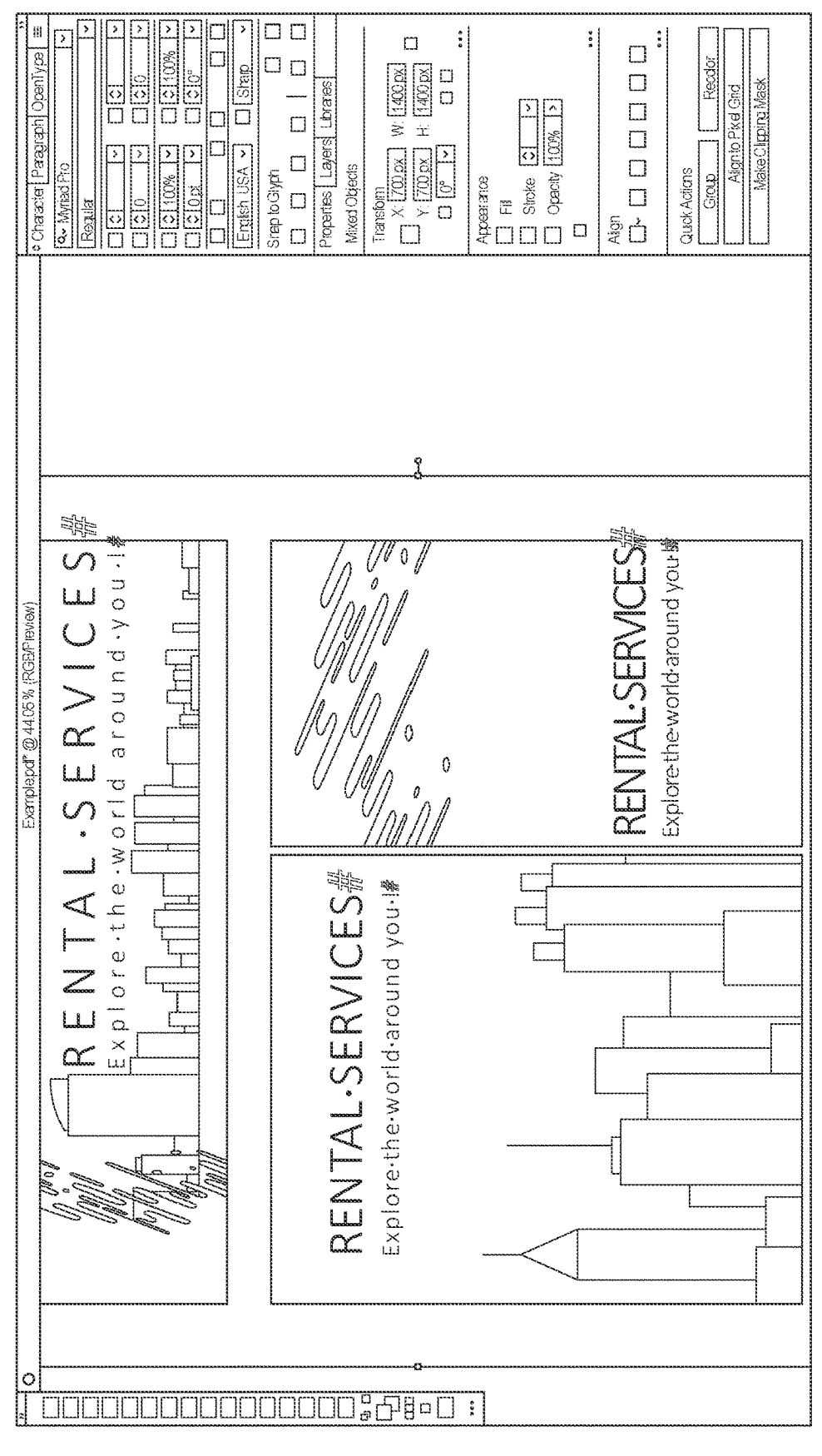
FIG. 4D provides an exemplary schematic screenshot from a personal computing device showing aspects of an example UI with the example document of FIG. 4A with automated reconstruction of glyph spacing properties applied, in accordance with embodiments of the present disclosure.
Figure 4E:
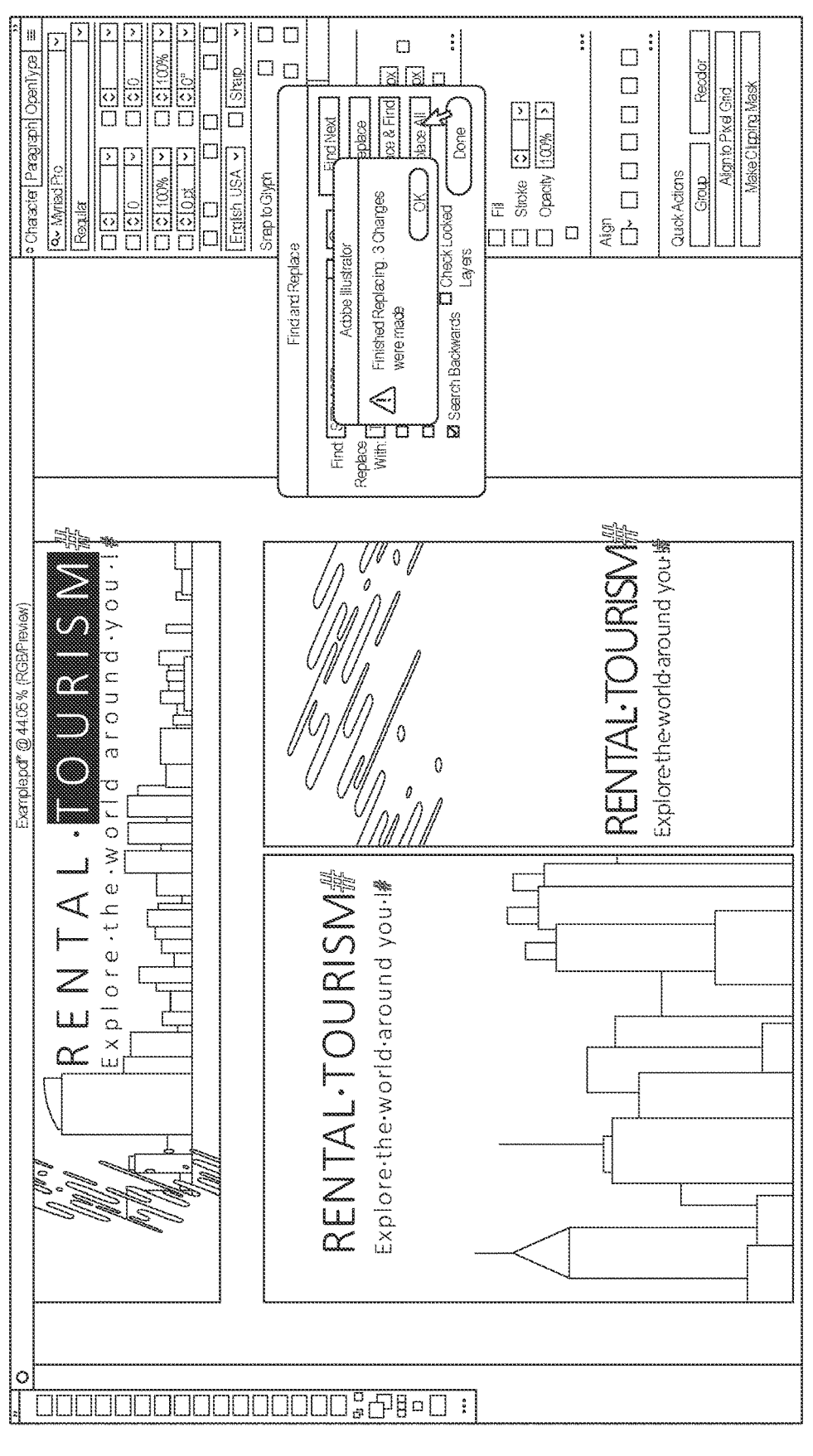
FIG. 4E provides an exemplary schematic screenshot from a personal computing device showing aspects of an example UI with the example document of FIG. 4A showing aspects of the text objects of the document after applying automated reconstruction of glyph spacing properties, in accordance with embodiments of the present disclosure.
Figure 4F:
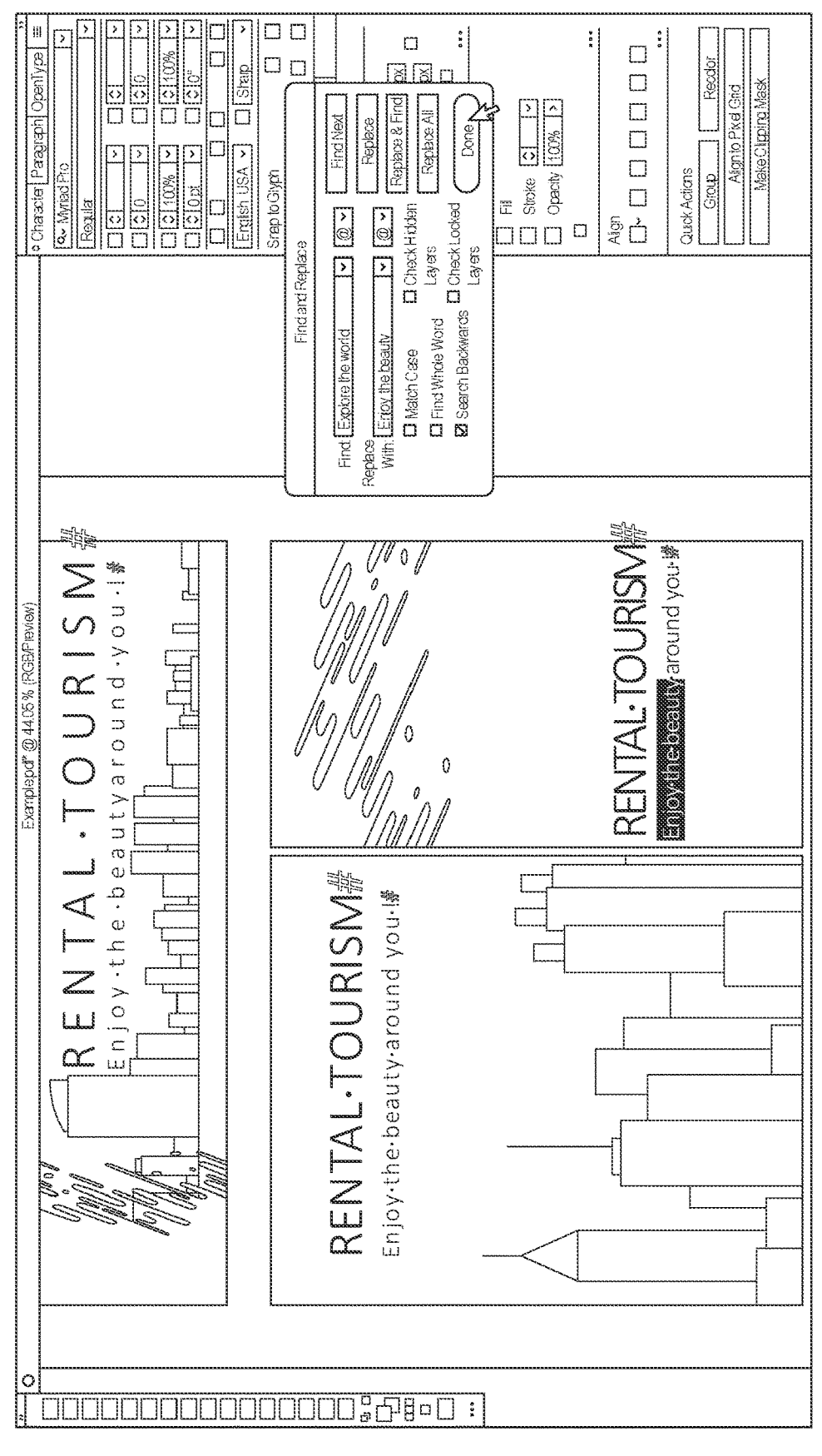
FIG. 4F provides an exemplary schematic screenshot from a personal computing device showing aspects of an example UI with the example document of FIG. 4A showing aspects of the text objects of the document after applying automated reconstruction of glyph spacing properties, in accordance with embodiments of the present disclosure.

An example of a document with reconstructed text objects with glyph spacing properties applied is shown in UI 106B of FIG. 1, UI 400D of FIG. 4D, UI 400E of FIG. 4E, and UI 400F of FIG. 4F. As can be understood from UI 106B of FIG. 1, the glyph spacing properties are applied to each of the text objects with positive tracking, standard tracking, and negative tracking. When a user edits the text object (e.g., by adding the word tracking or through a find and replace function), the tracking pattern of the text object is applied to the new text. Further, when a user searches for the term "increased tracking," the term that was previously not able to be found due to the addition of space characters is found.

As can be understood from UI 400D of FIG. 4D, the broken text of UI 400C of FIG. 4C is reconstructed with the glyph spacing properties of the original document. As can be understood from UI 400E of FIG. 4E, when a user triggers a find and replace function to replace "SERVICES" with "TOURISM," the term that was previously not able to be found due to the addition of space characters is found and the tracking pattern of the text object are applied to the new word. As can be understood from UI 400F of FIG. 4F, when a user triggers a find and replace function to replace "Explore the world" with "Enjoy the beauty," the term that was previously not able to be found due to the addition of space characters is found and the tracking pattern of the text object is applied to the new words.

Advantageously, efficiencies of computing and network resources can be enhanced using implementations described herein. In particular, the automated process for automated reconstruction of glyph spacing properties provides for a more efficient use of computing and network resources (e.g., less operations, higher throughput and reduced latency for a network, less packet generation costs, etc.) than prior methods. For example, using implementations described herein enhances efficiencies of computing and network resources with respect to prior methods of manually fixing a document exported in an non-native format requiring the manual insertion of new text objects with the desired spacing and/or the manual adjusting of the spacing upon reconstruction of each text object based on the specific spacing properties of the text in each text object.

Having provided an overview of the technology described herein, reference is now made to FIG. 1. FIG. 1 depicts an example configuration of an operating environment in which some implementations of the present disclosure can be employed. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether for the sake of clarity. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, some functions can be carried out by a processor executing instructions stored in memory as further described with reference to FIG. 8.

It should be understood that operating environment 100 shown in FIG. 1 is an example of one suitable operating environment. Among other components not shown, operating environment 100 includes a user device 102, application 110, network 104, and glyph spacing reconstruction manager 108. Operating environment 100 also shows an example 106 showing the reconstruction of glyph spacing properties in a document exported in a non-native format. Example 106 includes an example UI 106A of a document with text exported from an original format (e.g., Adobe Illustrator® format) into a non-native format (e.g., PDF) with text objects broken into smaller portions corresponding to each of the individual glyphs of the original text object. Example 106 also includes an example UI 106B of the document exported in a non-native format with reconstructed text objects with glyph spacing properties applied. Each of the components shown in FIG. 1 can be implemented via any type of computing device, such as one or more of computing device 800 described in connection to FIG. 8, for example.

These components can communicate with each other via network 104, which can be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, one or more private networks, one or more cellular networks, one or more peer-to-peer (P2P) networks, one or more mobile networks, or a combination of networks. Where network 104 includes a wireless telecommunications network, components such as a base station, a communications tower, or even access points (as well as other components) can provide wireless connectivity. Networking environments are commonplace in offices, enterprise-wide computer networks, intranets, and the Internet. Accordingly, network 104 is not described in significant detail.

It should be understood that any number of user devices, servers, and other components can be employed within operating environment 100 within the scope of the present disclosure. Each can comprise a single device or multiple devices cooperating in a distributed environment.

User device 102 can be any type of computing device capable of being operated by an individual(s) (e.g., any user that edits documents, designs, etc.). For example, in some implementations, such devices are the type of computing device described in relation to FIG. 8. By way of example and not limitation, user devices can be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user device 102 can include one or more processors, and one or more computer-readable media. The computer-readable media may include computer-readable instructions executable by the one or more processors. The instructions may be embodied by one or more applications, such as application 110 shown in FIG. 1. Application 110 is referred to as single applications for simplicity, but its functionality can be embodied by one or more applications in practice.

Application 110 operating on user device 102 can generally be any document editing application that allows a user to edit a document in a non-native format exported from an original format, such as from an original format of a design application (e.g., Adobe Illustrator®) or word processing application (e.g., Microsoft® Word) exports into a non-native format, such as SVG or PDF. In some implementations, the application 110 comprises a web application, which can run in a web browser, and could be hosted at least partially server-side (e.g., via glyph spacing reconstruction manager 108). In addition, or instead, the application 110 can comprise a dedicated application. In some cases, the application 110 is integrated into the operating system (e.g., as a service).

User device 102 can be a client device on a client-side of operating environment 100, while glyph spacing reconstruction manager 108 can be on a server-side of operating environment 100. Glyph spacing reconstruction manager 108 may comprise server-side software designed to work in conjunction with client-side software on user device 102 so as to implement any combination of the features and functionalities discussed in the present disclosure. An example of such client-side software is application 110 on user device 102. This division of operating environment 100 is provided to illustrate one example of a suitable environment, and it is noted there is no requirement for each implementation that any combination of user device 102 or glyph spacing reconstruction manager 108 to remain as separate entities.

Application 110 operating on user device 102 can generally be any application capable of facilitating the exchange of information between the user device 102 and the glyph spacing reconstruction manager 108 in displaying and exchanging information regarding glyph spacing reconstruction of text objects of the document. In some implementations, the application 110 comprises a web application, which can run in a web browser, and could be hosted at least partially on the server-side of environment 100. In addition, or instead, the application 110 can comprise a dedicated application. In some cases, the application 110 is integrated into the operating system (e.g., as a service). It is therefore contemplated herein that "application" be interpreted broadly.

At a high level, glyph spacing reconstruction manager 108 performs various functionality to facilitate efficient and effective automated reconstruction of glyph spacing properties. The glyph spacing reconstruction manager 108 can communicate with application 110 in order for application 110 to reconstruct the text objects of a document exported in a non-native format based on the specific spacing properties of the text in each text object. In this regard, glyph spacing reconstruction manager 108 can receive data regarding the document from application 110 of the user device.

In operation, a document with text is exported from an original format into a non-native format. For example, a user of design application (e.g., Adobe Illustrator®) or word processing application (e.g., Microsoft® Word) exports a document into SVG or PDF. In order to preserve the layout in the non-native format, the text of the document in the original format is broken into smaller portions in the non-native format. The user then opens the document in the non-native format via application 110 providing UI 106A via a display screen of user device 102. UI 106A of application 110 provides an example of a document with text objects broken into smaller portions corresponding to each of the individual glyphs of the original text objects. As can be understood from UI 106A, the hash characters are hidden glyphs that indicate an end of text marker. Upon reconstruction of the text object with positive tracking from the original format, additional space characters are provided after each end of text marker in the non-native format as the previous reconstruction technique cannot account for the positive tracking of the text object. Similarly, upon reconstruction of the text object with negative tracking from the original format, space characters are removed after the end of text marker of certain text elements (e.g., the space character between "decreased" and "tracking" is removed in UI 106A) as the reconstruction technique cannot account for the negative tracking of the text object.

The UI 106A shows a number of tools to edit the document. As shown, in UI 106A, the user can select an interaction element (e.g., "text merge") from a drop down menu in which glyph spacing reconstruction manager 108 implements the text reconstruction of the text objects of the document by determining the glyph spacing properties, such as the tracking and kerning parameters, of the text objects.

After the glyph spacing reconstruction manager 108 implements the text reconstruction of the text objects of document via application 110, UI 106B provides the document in the non-native format with the reconstructed text objects via a display screen of user device 102. UI 106B of application 110 provides an example of the document 218 with reconstructed text objects with glyph spacing properties applied. As can be understood from user interface 106B, the glyph spacing properties are applied to each of the text objects with positive tracking, standard tracking, and negative tracking. When a user edits the text object (e.g., by adding the word tracking or through a find and replace function) of the document via application 110, the tracking pattern of the text object is applied to the new text. Further, when a user searches for the term "increased tracking" in the document via application 110, the term that was previously not able to be found due to the addition of space characters is found.

Thus, glyph spacing reconstruction manager 108 performs various functionality to facilitate efficient and effective automated reconstruction of glyph spacing properties. The glyph spacing reconstruction manager 108 can communicate with application 110 in order for application 110 to reconstruct the text objects of a document exported in a non-native format based on the specific spacing properties of the text in each text object. In this regard, glyph spacing reconstruction manager 108 can receive data regarding the document from application 110 of the user device.

Glyph spacing reconstruction manager 108 can be or include a server, including one or more processors, and one or more computer-readable media. The computer-readable media includes computer-readable instructions executable by the one or more processors. The instructions can optionally implement one or more components of glyph spacing reconstruction manager 108, described in additional detail below with respect to glyph spacing reconstruction manager 202 of FIG. 2.

For cloud-based implementations, the instructions on glyph spacing reconstruction manager 108 can implement one or more components, and application 110 can be utilized by a user to interface with the functionality implemented on glyph spacing reconstruction manager 108. In some cases, application 110 comprises a web browser. In other cases, glyph spacing reconstruction manager 108 may not be required. For example, the components of glyph spacing reconstruction manager 108 may be implemented completely on a user device, such as user device 102. In this case, glyph spacing reconstruction manager 108 may be embodied at least partially by the instructions corresponding to application 110.

Thus, it should be appreciated that glyph spacing reconstruction manager 108 may be provided via multiple devices arranged in a distributed environment that collectively provide the functionality described herein. Additionally, other components not shown may also be included within the distributed environment. In addition, or instead, glyph spacing reconstruction manager 108 can be integrated, at least partially, into a user device, such as user device 102. Furthermore, glyph spacing reconstruction manager 108 may at least partially be embodied as a cloud computing service.

Figure 2:
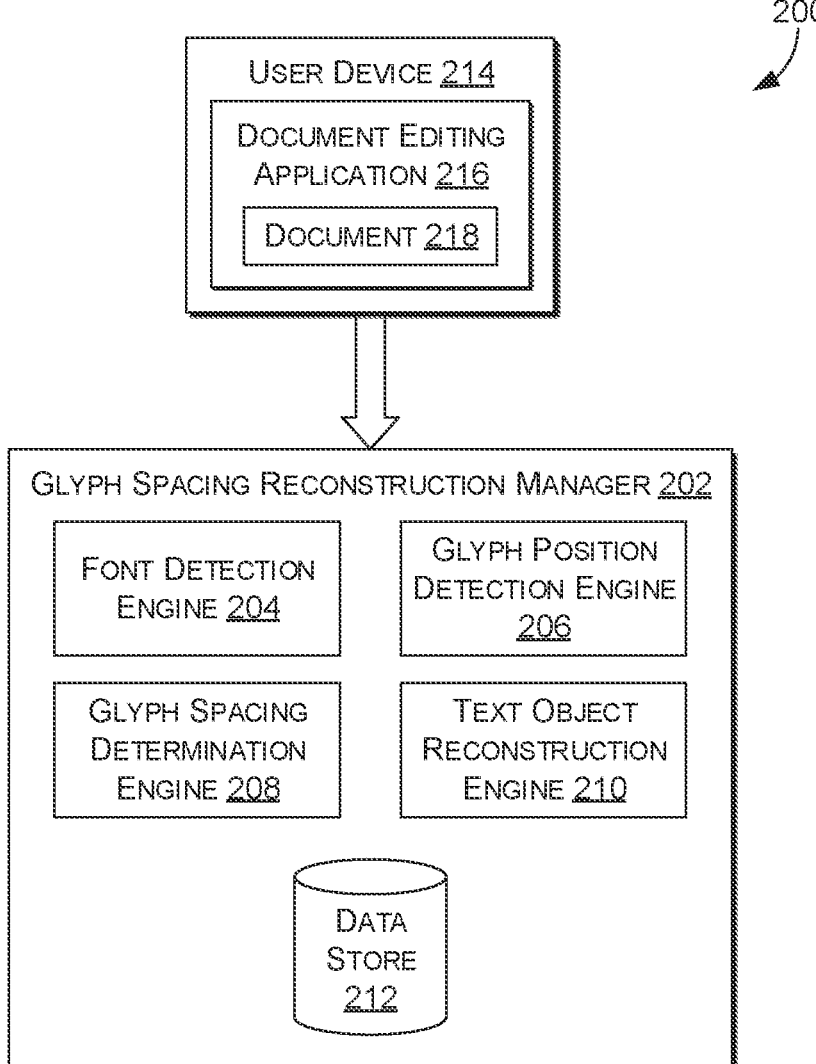
FIG. 2 depicts an example configuration of an operating environment in which some implementations of the present disclosure can be employed, in accordance with various embodiments of the present disclosure.

Referring to FIG. 2, aspects of an illustrative glyph spacing reconstruction system 200 are shown, in accordance with various embodiments of the present disclosure. At a high level, glyph spacing reconstruction system 200 can facilitate automated reconstruction of glyph spacing properties to reconstruct the text objects of a document exported in a non-native format based on the specific spacing properties of the text in each text object.

As shown in FIG. 2, glyph spacing reconstruction manager 202 includes font detection engine 204, glyph position detection engine 206, glyph spacing determination engine 208, and text object reconstruction engine 210. A user edits a document 218 (e.g., a document exported from an original format into a non-native format) through document editing application 216 (e.g., application 110 of FIG. 1) on user device 214 (e.g., user device 102 of FIG. 1). The glyph spacing reconstruction manager 202 facilitates automated reconstruction of glyph spacing properties to reconstruct the text objects of the document 218 based on the specific spacing properties of the text in each text object. The glyph spacing reconstruction manager 202 can communicate with the data store 212. The data store 212 is configured to store various types of information accessible by glyph spacing reconstruction manager 202, or other server or component. The foregoing components of glyph spacing reconstruction manager 202 can be implemented, for example, in operating environment 100 of FIG. 1. In particular, those components may be integrated into any suitable combination of user devices 102 and/or glyph spacing reconstruction manager 108.

In embodiments, data sources, user devices (such as user device 102 of FIG. 1), and glyph spacing reconstruction manager 202 can provide data to the data store 212 for storage, which may be retrieved or referenced by any such component. As such, the data store 212 can store computer instructions (e.g., software program instructions, routines, or services), data and/or models used in embodiments described herein, such as font detection algorithms, glyph position detection algorithms, tracking pattern determination algorithms, text object reconstruction algorithms, and/or the like. In some implementations, data store 212 can store information or data received or generated via the various components of glyph spacing reconstruction manager 202 and provides the various components with access to that information or data, as needed. The information in data store 212 may be distributed in any suitable manner across one or more data stores for storage (which may be hosted externally).

The font detection engine 204 is generally configured to access and/or determine the character, font, horizontal scaling, and/or vertical scaling of the glyph. In embodiments, font detection engine 204 can include rules, conditions, associations, models, algorithms, or the like to access and/or determine the character, font, horizontal scaling, and/or vertical scaling of the glyph. For example, font detection engine 204 may comprise a statistical model, fuzzy logic, neural network, finite state machine, support vector machine, logistic regression, clustering, or machine-learning techniques, similar statistical classification processes, or combinations of these to access and/or determine the character, font, horizontal scaling, and/or vertical scaling of the glyph.

In some embodiments, optical character recognition and/or font detection algorithm can be utilized by font detection engine 204 to determine the character, font, horizontal scaling, and/or vertical scaling of each glyph. As another example, the character, font, horizontal scaling, and/or vertical scaling of the glyph can be accessed from metadata of the original document and/or exported document by font detection engine 204.

The glyph position detection engine 206 is generally configured to determine the position of each glyph. In embodiments, glyph position detection engine 206 can include rules, conditions, associations, models, algorithms, or the like to determine the position of each glyph. For example, glyph position detection engine 206 may comprise a statistical model, fuzzy logic, neural network, finite state machine, support vector machine, logistic regression, clustering, or machine-learning techniques, similar statistical classification processes, or combinations of these to determine the position of each glyph.

In embodiments, glyph position detection engine 206 determines the position of each glyph, including the left position and right position of each glyph. An example of determining the position of each glyph, including the left position and right position of each glyph, is shown at FIG. 3A. As can be understood from diagram 300A of FIG. 3A, the left position and right position can be determined by glyph position detection engine 206 based on the real space of each glyph. As shown in FIG. 3A, the left position of the glyph can be determined by glyph position detection engine 206 based on the left edge of the glyph and the left bearing of the glyph based on the character and font of the glyph (e.g., as determined by font detection engine 204). In some embodiments, the left position of the glyph is referred to as the glyph origin. The right position of the glyph can be determined by glyph position detection engine 206 based on the right edge of the glyph and the right bearing of the glyph based on the character and font of the glyph (e.g., as determined by font detection engine 204). A bounding box of the glyph can be determined by glyph position detection engine 206 based on the left edge, right edge, top edge, bottom edge, and/or the bearings of the glyph. In some embodiments, the bounding box can be used by glyph position detection engine 206 and/or font detection engine 204 to determine the horizontal scaling, and/or vertical scaling of the glyph.

As an example, algorithm 1 presents pseudo code describing an algorithm for glyph position detection by glyph position detection engine 206:

| Algorithm 1: Left Position N Right Position Extraction |
| --- |
| 1:      procedure GLYPH EXTREME POSITION DETECTION |
| 2:        For a glyph, extract its G = Glyph Origin |
| 3:        L(Left position) = Glyph Origin. Glyph Origin is the Left position of the glyph |
| 4:        lb = Extract the left bearing of the glyph |
| 5:        rb = Extract the right bearing of the glyph |
| 6:        width = Extract the glyph width from its bbox |
| 7:        R(Right Position) = GlyphOrigin G + LeftBearing lb + GlyphWdith + RightBearing rb |

The glyph spacing determination engine 208 is generally configured to determine glyph spacing properties (e.g., tracking patterns, custom kerning values, the location of space characters, etc.) corresponding to the spacing of sets of glyphs in the document. In embodiments, glyph spacing determination engine 208 can include rules, conditions, associations, models, algorithms, or the like to determine glyph spacing properties corresponding to the spacing of sets of glyphs in the document. For example, glyph spacing determination engine 208 may comprise a statistical model, fuzzy logic, neural network, finite state machine, support vector machine, logistic regression, clustering, or machine-learning techniques, similar statistical classification processes, or combinations of these to determine glyph spacing properties corresponding to the spacing of sets of glyphs in the document.

The text object reconstruction engine 210 is generally configured to reconstruct the sets of glyphs in the document by applying the determined glyph spacing properties to the sets of glyphs. In embodiments, text object reconstruction engine 210 can include rules, conditions, associations, models, algorithms, or the like to reconstruct the sets of glyphs in the document by applying the determined glyph spacing properties to the sets of glyphs. For example, text object reconstruction engine 210 may comprise a statistical model, fuzzy logic, neural network, finite state machine, support vector machine, logistic regression, clustering, or machine-learning techniques, similar statistical classification processes, or combinations of these to reconstruct the sets of glyphs in the document by applying the determined glyph spacing properties to the sets of glyphs.

In embodiments, the distance between each glyph is determined by glyph spacing determination engine 208 based on the distance between the positions of each adjacent glyph. For example, the distance of the gap between the right position (e.g., the right bearing) of each glyph to a corresponding left position (e.g., the left bearing) of the left adjacent glyph is determined by glyph spacing determination engine 208. An example of determining the distance between each glyph based on the distance the position of each adjacent glyph is shown at FIGS. 3B and 3E. As can be understood from diagram 300B of FIG. 3B, the left position and right position of each glyph determined by glyph position detection engine 206 are located by glyph spacing determination engine 208 as shown by the corresponding bounding boxes of each glyph (e.g., where the bounding boxes include the bearings of each glyph). In diagram 300E of FIG. 3E, the distance between the left position of the first glyph "T" to the right position of the second glyph "w" is 60 units as determined by glyph spacing determination engine 208. The distance between the left position of the second glyph "w" to the right position of the third glyph "i" is 100 units as determined by glyph spacing determination engine 208. The distance between the left position of the third glyph "i" to the right position of the fourth glyph "g" is 100 units as determined by glyph spacing determination engine 208.

In embodiments, automatic kerning is applied to the glyphs by glyph spacing determination engine 208. In this regard, the distance between each glyph can be determined by glyph spacing determination engine 208 when automatic kerning is applied to the glyphs. For example, the distance of the gap between the right position (e.g., the right bearing) of each glyph to a corresponding left position (e.g., the left bearing) of the left adjacent glyph is determined by glyph spacing determination engine 208 when automatic kerning is applied to the glyphs. An example of determining the distance between each glyph when automatic kerning is applied to the glyphs is shown at FIGS. 3D and 3E. As can be understood from diagram 300D of FIG. 3D, left position and right position of each glyph as determined by glyph position detection engine 206 are located by glyph spacing determination engine 208 when automatic kerning is applied to the glyphs as shown by the corresponding bounding boxes of each glyph. In diagram 300E of FIG. 3E, the distance between the left position of the first glyph "T" to the right position of the second glyph "w" is −40 units as determined by glyph spacing determination engine 208. The distance between the left position of the second glyph "w" to the right position of the third glyph "i" is 0 units as determined by glyph spacing determination engine 208. The distance between the left position of the third glyph "i" to the right position of the fourth glyph "g" is 0 units as determined by glyph spacing determination engine 208.

In embodiments, the distance between each glyph is determined by glyph spacing determination engine 208 based on the difference between the original distance between each glyph and the distance between each glyph when automatic kerning is applied. An example of determining the distance between each glyph based on the difference between the original distance between each glyph and the distance between each glyph when automatic kerning is applied is shown at FIG. 3E. As can be understood from diagram 300E of FIG. 3E, the distance between the left position of the first glyph "T" to the right position of the second glyph "w" is determined to be 100 units by glyph spacing determination engine 208. The distance between the left position of the second glyph "w" to the right position of the third glyph "i" is determined to be 100 units by glyph spacing determination engine 208. The distance between the left position of the third glyph "i" to the right position of the fourth glyph "g" is determined to be 100 units by glyph spacing determination engine 208.

In embodiments, a tracking pattern corresponding to the spacing of the set of glyphs can be determined by glyph spacing determination engine 208 based on the difference between the original distance between each glyph and the distance between each glyph when automatic kerning is applied. The tracking pattern can then be applied to the text object by text object reconstruction engine 210 after applying automatic kerning to the text object in order to reconstruct the glyph spacing properties of the text object. An example of applying the tracking pattern (e.g., as determined based on the spacing computing in FIG. 3E) is shown at FIG. 3F. As can be understood from diagram 300F of FIG. 3F, automatic kerning, along with tracking of "100" units, is applied to the glyphs by text object reconstruction engine 210 in order to facilitate reconstruction of the glyph spacing properties of the text from the original document.

In some embodiments, the gaps (e.g., distances between each successive glyph) between glyphs can be computed sequentially by glyph spacing determination engine 208 based on the next successive glyph in each text object of the document in order to determine whether to maintain the tracking pattern and/or implement a new tracking pattern for the text object. In some embodiments, the text object may include multiple tracking patterns determined by glyph spacing determination engine 208 and subsequently applied by text object reconstruction engine 210. For example, as shown in diagram 300G of FIG. 3G, a text object includes a word with a first tracking pattern corresponding to a spacing of 10 units and a second tracking pattern corresponding to a spacing of 40 units. In this regard, each tracking pattern can be ended by glyph spacing determination engine 208 when a new tracking pattern is encountered at the next successive glyph.

In some embodiments, each tracking pattern can include a tolerance determined by glyph spacing determination engine 208 to determine whether the tracking pattern is continuous for a set of glyphs. For example, gaps may include slight deflections from actual values due to either text recognition precision issues and/or issues due to saving the document in non-native formats. In some embodiments, the tolerance of the tracking pattern determined by glyph spacing determination engine 208 is dynamic in that the tolerance is compared to an average of each gap between each successive glyph of the corresponding tracking pattern. In some embodiments, the tolerance and/or dynamic tolerance is determined by glyph spacing determination engine 208 based on the font size. For example, the tolerance and/or dynamic tolerance can be based on the font size divided by 5. In some embodiments, for example with respect to tracking patterns with negative tracking, the tolerance and/or dynamic tolerance is compared by glyph spacing determination engine 208 with the absolute value of the average of each gap between each successive glyph of the corresponding tracking pattern.

Examples of computing the tracking pattern based on a dynamic tolerance is shown in FIGS. 3H and 3I. As can be understood from diagram 300H of FIG. 3H, in the first example, the real glyph gaps (e.g., the distance between each glyph determined based on the difference between the original distance between each glyph and the distance between each glyph when automatic kerning is applied) between each successive glyph is 95 units, 100 units, and 108 units as determined by glyph spacing determination engine 208. The font size of the glyphs is 50 points as determined by font detection engine 204. The dynamic tolerance is computed by glyph spacing determination engine 208 as font size divided by 5, which equals 10 units. In this regard, the second real glyph gap of 100 units is within (e.g., less than and/or less than or equal) 10 units (e.g., the tolerance) of 97.5 units (e.g., the average of 95 units of the first real glyph gap and 100 units of the second real glyph gap) as determined by glyph spacing determination engine 208. The third real glyph gap of 108 units is within 10 units (e.g., the tolerance) of 101 units (e.g., the average of 95 units of the first real glyph gap, 100 units of the second real glyph gap, and 108 units of the third real glyph gap) as determined by glyph spacing determination engine 208. The tracking pattern is the average of the real glyph gaps (e.g., 101 units) as determined by glyph spacing determination engine 208. The difference between the real glyph gap and the tracking pattern can be adjusted with a custom kerning parameter for a corresponding glyph as applied by text object reconstruction engine 210.

In the second example of diagram 300H of FIG. 3H, the real glyph gaps between each successive glyph is 9 units, 10 units, and 11 units as determined by glyph spacing determination engine 208. The font size of the glyphs is 10 points as determined by font detection engine 204. The dynamic tolerance is computed by glyph spacing determination engine 208 as font size divided by 5, which equals 2 units. In this regard, the second real glyph gap of 10 units is within 2 units (e.g., the tolerance) of 9.5 units (e.g., the average of 9 units of the first real glyph gap and 10 units of the second real glyph gap) as determined by glyph spacing determination engine 208. The third real glyph gap of 11 units is within 2 units (e.g., the tolerance) of 2 units (e.g., the average of 9 units of the first real glyph gap, 10 units of the second real glyph gap, and 11 units of the third real glyph gap) as determined by glyph spacing determination engine 208. The tracking pattern is the average of the real glyph gaps (e.g., 10 units) as determined by glyph spacing determination engine 208. The difference between the real glyph gap and the tracking pattern can be adjusted with a custom kerning parameter for a corresponding glyph as applied by text object reconstruction engine 210.

As can be understood from diagram 300I of FIG. 3I, the real glyph gaps of the first tracking series (e.g., tracking pattern) of 10 units are within the dynamic tolerance of 2 units as determined by glyph spacing determination engine 208. However, the real glyph gap between the fourth glyph and the fifth glyph of 40 units is not within the dynamic tolerance of 2 units to the 10 unit tracking series as determined by glyph spacing determination engine 208. Therefore, the first tracking series of 10 units is ended by glyph spacing determination engine 208 and a second tracking series begins between the fourth glyph and the fifth glyph.

In some embodiments, when real glyph gaps are close to zero (e.g., real glyph gaps of a tracking series are 0.2, 0, 0.1, −0.1, 0, 0.03 are within a threshold tolerance with respect to 0 units) as determined by glyph spacing determination engine 208, no tracking pattern is applied to the glyphs by text object reconstruction engine 210. In some embodiments, no tracking pattern is applied to the glyphs by text object reconstruction engine 210 when the glyph gaps are within a threshold tolerance of zero (e.g., close to zero units) and the threshold tolerance with respect to zero is determined based on the font size of the glyphs. In some embodiments, when real glyph gaps are close to zero, each of the glyph gaps can be adjusted with a custom kerning parameter for a corresponding glyph by text object reconstruction engine 210.

In some embodiments, a location of a space character is determined by glyph spacing determination engine 208 based on a distance between adjacent glyphs that is above a threshold value with respect to the tracking pattern. In this regard, the space character can be inserted into the location between the adjacent glyphs by text object reconstruction engine 210 in order to facilitate reconstruction of the text from the original document. In some embodiments, while determining the tracking pattern for a set of glyphs by glyph spacing determination engine 208, a real glyph gap above a tolerance of the tracking pattern is determined to be a candidate for a space character only if the next adjacent real glyph gap is within tolerance of the tracking pattern. When the next adjacent real glyph gap is within tolerance of the tracking pattern, the real glyph gap determined by glyph spacing determination engine 208 to be the candidate for a space character is excluded from the calculation of the average tracking pattern. For example, if the real glyph gaps between each successive glyph is 2 units, 2 units, 2 units, 10 units, 2 units, and 2 units, and the tolerance is 2 units, the fourth real glyph gap of 10 units is determined by glyph spacing determination engine 208 to be a candidate for a space character as the tracking pattern returns to the original tracking pattern of 2 units at the fifth real glyph gap. In this regard, the fourth real glyph gap of 10 units is excluded from calculation of the average tracking pattern. However, in another example, if the real glyph gaps between each successive glyph is 2 units, 2 units, 2 units, 10 units, 10 units, and 10 units, and the tolerance is 2 units, the fourth real glyph gap of 10 units is determined by glyph spacing determination engine 208 to not be a candidate for a space character as the tracking pattern does not return to the previous tracking pattern of 10 units. Rather, in this scenario a new tracking pattern of 10 units begins.

Examples of determining a location of a space character based on a distance between adjacent glyphs that is above a threshold value with respect to the tracking pattern is shown in FIGS. 3J, 3K, and 3L. As can be understood from diagram 300J of FIG. 3J and diagram 300K of FIG. 3K, the real glyph gap of 38 units, which is above a tolerance (e.g., for a font size of 12, and a tolerance computed as font size/5, the tolerance can be computed as 2.4) of the 10 unit tracking pattern, is determined by glyph spacing determination engine 208 to be a candidate for a space character as the prior real glyph gap of 11 units and the subsequent real glyph gap units are within the tolerance of the tracking pattern. As shown in diagram 300K of FIG. 3K, after applying the tracking pattern by text object reconstruction engine 210, the location determined to be a candidate for a space character includes a distance of 28 units.

In this regard, the location determined to be a candidate for a space character can be determined by glyph spacing determination engine 208 to be the location for a space character based on whether the distance of the gap is greater than and/or equal to a threshold length occupied by the space glyph (e.g., the length of the space character in the corresponding font). In some embodiments, the length occupied by the space glyph is equal to the length of the space glyph plus the length of the spacing of the tracking pattern. In some embodiments, the length of the space glyph can be adjusted by glyph spacing determination engine 208 to be a kerning adjusted space glyph based on the following equation:

$$kern = \left( \frac{1000 * d}{size * s_x} \right)$$

where d is advance distance between the adjacent glyph, size is font size and $s_x$ is horizontal and/or vertical scale.

For example, with respect to the example shown in FIGS. 3J-3M, the font of the glyphs is Myriad Pro, the font size is 12 units, the horizontal scale is 100%, and the tracking is determined to be 10 units. If the length of the space glyph is 18 units, the kerning adjusted space glyph can be computed by glyph spacing determination engine 208 as follows:

$$kern = \left( \frac{1000 * 18}{12 * 100} \right) = 15 \text{ units}$$

In this example, as the tracking is determined to be 10 units, length occupied by the space glyph is 25 units.

As can be understood from diagram 300L of FIG. 3L, the location of a space character is determined to be a location for a space character as the distance of 28 units distance is determined by glyph spacing determination engine 208 to be above a threshold value of 25 units corresponding to the space character length and tracking pattern. Following insertion of the space character by text object reconstruction engine 210, a distance of 3 units remains in the location which can be adjusted with a custom kerning parameter by text object reconstruction engine 210.

In some embodiments, a location of a custom kerning value is determined based on a distance between adjacent glyphs that is below a threshold value with respect to the tracking pattern by glyph spacing determination engine 208. In this regard, the custom kerning value can be applied to a corresponding glyph by text object reconstruction engine 210 in order to facilitate reconstruction of the glyph spacing properties from the original document. In some embodiments, any negative space (e.g., after applying the average tracking to the glyphs) is automatically filled by a corresponding custom kerning value to a corresponding glyph by text object reconstruction engine 210. In some embodiments, the remaining space filled by custom kerning values is only determined by text object reconstruction engine 210 after applying, or determining whether to apply, space characters to locations with enough space to fit a space character.

An example of determining a location of a custom kerning value based on a distance between adjacent glyphs that is below a threshold value with respect to the tracking pattern is shown in FIG. 3M. As can be understood from diagram 300M of FIG. 3M, the locations of custom kerning values are determined by text object reconstruction engine 210 as each of the remaining gaps computed in diagram 300L of FIG. 3L are negative or below a threshold value for insertion of a space character. In this regard, text object reconstruction engine 210 applies a custom kerning value of −1 unit to the "L" glyph, a custom kerning value of 1 unit to the "E" glyph, a custom kerning value of 3 units to the space character, a custom kerning value of −1 unit to the "T" glyph, a custom kerning value of 1 unit to the "R" glyph, a custom kerning value of −1 unit to the "C" glyph, and a custom kerning value of −1 unit to the "K" glyph. As such, the text object can be output by text object reconstruction engine 210 with the custom tracking and kerning properties applied to the text object in the document so that the document can be searched and/or edited.

In embodiments, the glyph spacing properties can be applied to the text of the document by text object reconstruction engine 210 to allow a user to search for words that would otherwise be represented as broken text and unsearchable and/or apply the glyph spacing properties to a corresponding text object when the user edits the document. For example, following text reconstruction with the glyph spacing properties by text object reconstruction engine 210, responsive to a user triggering a search function for a word or a portion thereof in the document 218 via the document editing application 216, the word can be identified from the reconstructed glyphs in the document 218 via the document editing application 216. As another example, following text reconstruction with the glyph spacing properties by text object reconstruction engine 210, responsive to a user editing a text object to include new characters in the document 218 via the document editing application 216, the glyph spacing properties, such as the tracking pattern, can be applied to the new characters in the text object in the document 218 via the document editing application 216. As another example, following text reconstruction with the glyph spacing properties by text object reconstruction engine 210, responsive to a user triggering find and replace function for a word or a portion thereof with a new word or portion thereof in the document 218 via the document editing application 216, the word can be identified and replaced from the reconstructed glyphs with the glyph spacing properties, such as the tracking pattern applied to the new word or portion thereof, in the document 218 via the document editing application 216.

An example of a document with reconstructed text objects with glyph spacing properties applied is shown in user interface 106B of FIG. 1, user interface 400D of FIG. 4D, user interface 400E of FIG. 4E, and user interface 400F of FIG. 4F. As can be understood from user interface 106B of FIG. 1, the glyph spacing properties are applied to each of the text objects by text object reconstruction engine 210 with positive tracking, standard tracking, and negative tracking. When a user edits the text object (e.g., by adding the word tracking or through a find and replace function) in the document 218 via the document editing application 216, the tracking pattern of the text object is applied to the new text. Further, when a user searches for the term "increased tracking," the term that was previously not able to be found due to the addition of space characters is found.

As can be understood from user interface 400D of FIG. 4D, the broken text of user interface 400C of FIG. 4C is reconstructed with the glyph spacing properties of the original document by text object reconstruction engine 210. As can be understood from user interface 400E of FIG. 4E, when a user triggers a find and replace function to replace "SERVICES" with "TOURISM" in the document 218 via the document editing application 216, the term that was previously not able to be found due to the addition of space characters is found and tracking pattern of the text object is applied to the new word. As can be understood from user interface 400F of FIG. 4F, when a user triggers a find and replace function to replace "Explore the world" with "Enjoy the beauty" in the document 218 via the document editing application 216, the term that was previously not able to be found due to the addition of space characters is found and tracking pattern of the text object is applied to the new words.

Figure 7:
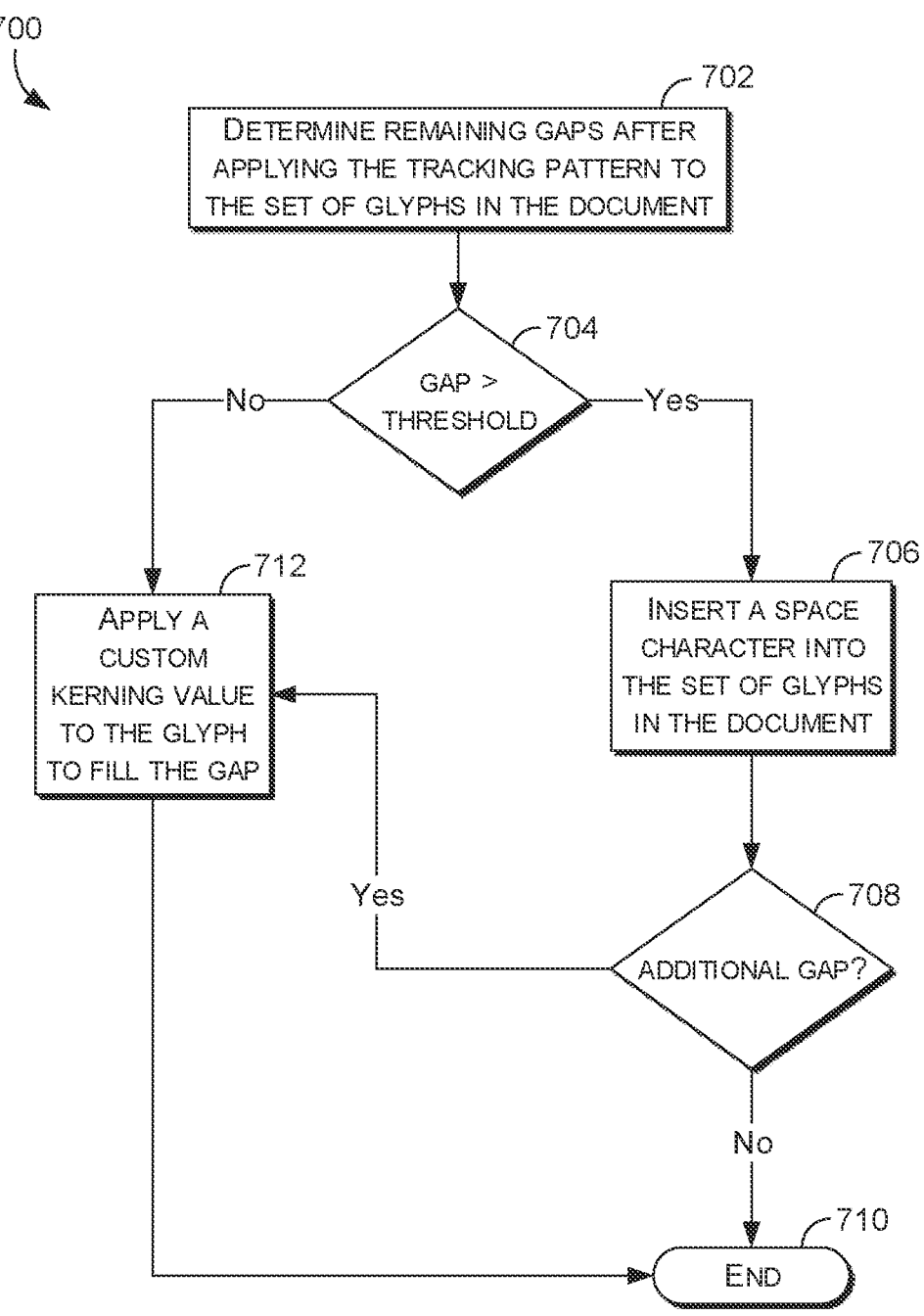
FIG. 7 is a process flow showing a method for determining a location of space character and/or a location of a custom kerning parameter for automated reconstruction of glyph spacing properties, in accordance with embodiments of the present disclosure.

With reference now to FIGS. 5-7, FIGS. 5-7 provide method flows related to facilitating automated reconstruction of glyph spacing properties, in accordance with embodiments of the present technology. Each block of method 500, 600 and 700 comprises a computing process that can be performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few. The method flows of FIGS. 5-7 are exemplary only and not intended to be limiting. As can be appreciated, in some embodiments, method flows 500-700 can be implemented, at least in part, to facilitate automated reconstruction of glyph spacing properties.

Turning now to FIG. 5, a flow diagram 500 is provided showing an embodiment of a method 1000 for automated reconstruction of glyph spacing properties, in accordance with embodiments described herein. Initially, at block 502, a document is accessed that includes a set of glyphs. In some embodiments, the document is exported from an original format into a non-native format. For example, a user of design application (e.g., Adobe Illustrator®) or word processing application (e.g., Microsoft® Word) exports a document into SVG or PDF. In some embodiments, in order to preserve the layout in the non-native format, the text of the document in the original format is broken into smaller portions in the non-native format.

At block 504, a tracking pattern for the set of glyphs that identifies spacing of the set of glyphs in the document is determined based on a position of a glyph of the set of glyphs in the document relative to a corresponding position of the glyph when automatic kerning is applied. Embodiments describing determining the tracking pattern are provided in further detail with respect to flow diagram 600 of FIG. 6. In some embodiments, the tracking pattern is determined with respect to a tolerance and/or a dynamic tolerance of the tracking pattern. In some embodiments, a text object may include multiple tracking patterns.

At block 506, the tracking pattern is applied to the set of glyphs in the document. In some embodiments, space characters and/or automatic kerning values are applied to the glyphs. Embodiments describing determining a location of space character and/or a location of a custom kerning parameter for automated reconstruction of glyph spacing properties are provided in further detail respect to flow diagram 700 of FIG. 7. In some embodiments, the glyph spacing properties can be applied to the text of the document to allow a user to search for words that would otherwise be represented as broken text and unsearchable and/or apply the glyph spacing properties to a corresponding text object when the user edits the document. For example, following text reconstruction with the glyph spacing properties, responsive to a user triggering a search function for a word or a portion thereof, the word can be identified from the reconstructed glyphs. As another example, following text reconstruction with the glyph spacing properties, responsive to a user editing a text object to include new characters, the glyph spacing properties, such as the tracking pattern, can be applied to the new characters in the text object. As another example, following text reconstruction with the glyph spacing properties, responsive to a user triggering find and replace function for a word or a portion thereof with a new word or portion thereof, the word can be identified and replaced from the reconstructed glyphs with the glyph spacing properties, such as the tracking pattern applied to the new word or portion thereof.

Turning now to FIG. 6, a flow diagram 600 is provided showing an embodiment of a method 600 for determining the tracking pattern for automated reconstruction of glyph spacing properties, in accordance with embodiments described herein. Initially, at block 602, a left edge of the glyph and a right edge of the glyph are determined. At block 604, a left bearing from the left edge of the glyph and a right bearing from the right edge of the glyph are determined based on a corresponding font of the glyph. In some embodiments, at least one of the left bearing and right bearing of the glyph corresponds to the position of the glyph. In some embodiments, the left position of the glyph (e.g., the left bearing) is referred to as the glyph origin. In some embodiments, the character, font, horizontal scaling, and/or vertical scaling of the glyph can be accessed and/or determined in order to determine the position of the glyph. For example, optical character recognition and/or font detection algorithm can be utilized to determine the character, font, horizontal scaling, and/or vertical scaling of each glyph. As another example, the character, font, horizontal scaling, and/or vertical scaling of the glyph can be accessed from metadata of the original document and/or exported document.

At block 606, a gap between the right bearing of the glyph to a corresponding left bearing of a different glyph adjacent to the glyph in the set of glyphs is determined. In this regard, the distance (e.g., the gap) between each glyph is determined based on the distance between the positions of each adjacent glyph. At block 608, an automatic kerning gap between the right bearing of the glyph to the corresponding left bearing of the different glyph (e.g., the adjacent glyph in the set of glyphs) is determined when automatic kerning is applied to the set of glyphs. In some embodiments, the automatic kerning values of each of the glyphs are determined based on the font of the glyphs.

At block 610, the spacing of the tracking pattern is determined based on a difference between the gap and the automatic kerning gap. In this regard, the tracking pattern corresponding to the spacing of the set of glyphs can be determined based on the difference between the original distance between each glyph and the distance between each glyph when automatic kerning is applied. In some embodiments, the gaps (e.g., distances between each successive glyph) between glyphs can be computed sequentially based on the each next successive glyph in each text object of the document in order to determine whether to maintain the tracking pattern and/or implement a new tracking pattern for the text object.

Turning now to FIG. 7, a flow diagram 700 is provided showing an embodiment of a method 700 for determining a location of space character and/or a location of a custom kerning parameter for automated reconstruction of glyph spacing properties, in accordance with embodiments described herein. Initially, at block 702, any remaining gaps between glyphs after applying the tracking pattern to the set of glyphs in the document are determined. For example, after applying the tracking pattern, any remaining gaps between the right bearing of the glyph to a corresponding left bearing of a different glyph adjacent to the glyph in the set of glyphs are determined.

At block 704, for each remaining gap, it is determined whether the gap is greater than a threshold value. For example, the threshold value can be determined based on the space glyph length for the corresponding font of a glyph in the set of glyphs. In some embodiments, the threshold value corresponds to a kerning adjusted space glyph length. In some embodiments, while determining the tracking patterns for a set of glyphs, a real glyph gap (e.g., the distance between each glyph determined based on the difference between the original distance between each glyph and the distance between each glyph when automatic kerning is applied) above a tolerance (e.g., dynamic tolerance) of the tracking pattern is determined to be a candidate for a space character only if the next adjacent real glyph gap is within tolerance of the tracking pattern. In this regard, when the next adjacent real glyph gap is within tolerance of the tracking pattern, the real glyph gap determined to be the candidate for a space character is excluded from the calculation of the average tracking pattern. If the next adjacent real glyph gap is not within tolerance of the tracking pattern, a new tracking pattern is started and no space character is inserted into the gap.

At block 706, if the gap is greater than the threshold value (e.g., the length of the space character and any tracking value of the tracking pattern), a space character is inserted into the set of glyphs in the document. In this regard, a location of a space character is determined based on a distance between adjacent glyphs that is above a threshold value and the space character can be inserted into the location between the adjacent glyphs in order to facilitate reconstruction of the text from the original document.

At block 708, it is determined whether there are any additional gap between glyphs after applying the space character. If there are no additional gaps, the text object is reconstructed with the space character inserted between the glyphs at block 710. If the gap is less than a threshold value (e.g., less than the length of a space glyph and tracking value of the tracking pattern) at block 704 or if there are any remaining gaps after inserting the space characters at block 708, a custom kerning value is applied to the corresponding glyph to fill the remaining gaps at block 712. In this regard, a location of a custom kerning value is determined based on a distance between adjacent glyphs that is below a threshold value in order to facilitate reconstruction of the glyph spacing properties from the original document. In some embodiments, any negative gaps (e.g., after applying the average tracking to the glyphs) are automatically filled by a corresponding custom kerning value to a corresponding glyph. In some embodiments, the remaining gaps filled by custom kerning values are only determined after applying space characters to locations with enough gap length to fit a space character.

Having briefly described an overview of aspects of the technology described herein, an exemplary operating environment in which aspects of the technology described herein may be implemented is described below in order to provide a general context for various aspects of the technology described herein.

Figure 8:
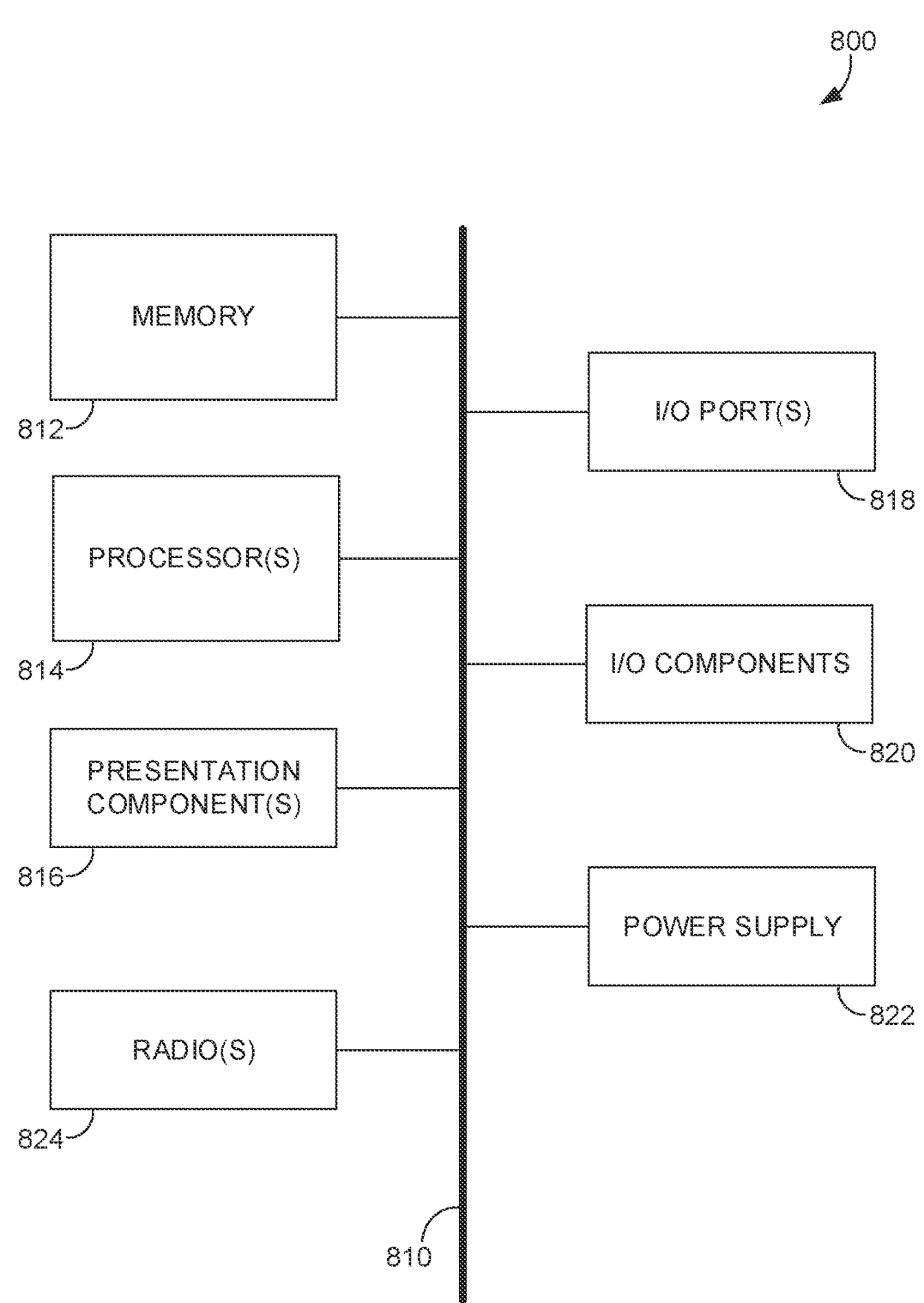
FIG. 8 is a block diagram of an example computing device in which embodiments of the present disclosure can be employed.

Referring to the drawings in general, and initially to FIG. 8 in particular, an exemplary operating environment for implementing aspects of the technology described herein is shown and designated generally as computing device 800. Computing device 800 is just one example of a suitable computing environment and is not intended to suggest any limitation as to the scope of use or functionality of the technology described herein. Neither should the computing device 800 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, and specialty computing devices. Aspects of the technology described herein may also be practiced in distributed computing environments where tasks are performed by remote-processing devices that are linked through a communications network.

With continued reference to FIG. 8, computing device 800 includes a bus 810 that directly or indirectly couples the following devices: memory 812, one or more processors 814, one or more presentation components 816, input/output (I/O) ports 818, I/O components 820, an illustrative power supply 822, and a radio(s) 824. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 8 is merely illustrative of an exemplary computing device that can be used in connection with one or more aspects of the technology described herein. Distinction is not made between such categories as "workstation," "server," "laptop," and "handheld device," as all are contemplated within the scope of FIG. 8 and refer to "computer" or "computing device."

Computing device 800 typically includes a variety of computer-readable media. Computer-readable media can be any available media that can be accessed by computing device 800 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 812 includes computer storage media in the form of volatile and/or nonvolatile memory. The memory 812 may be removable, non-removable, or a combination thereof. Exemplary memory includes solid-state memory, hard drives, and optical-disc drives. Computing device 800 includes one or more processors 814 that read data from various entities such as bus 810, memory 812, or I/O components 820. Presentation component(s) 816 present data indications to a user or other device. Exemplary presentation components 816 include a display device, speaker, printing component, and vibrating component. I/O port(s) 818 allow computing device 800 to be logically coupled to other devices including I/O components 820, some of which may be built in.

Illustrative I/O components include a microphone, joystick, game pad, satellite dish, scanner, printer, display device, wireless device, a controller (such as a keyboard, and a mouse), a natural UI (NUI) (such as touch interaction, pen (or stylus) gesture, and gaze detection), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 814 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs may be interpreted as ink strokes for presentation in association with the computing device 800. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 800. The computing device 800 may be equipped with depth cameras, such as stereoscopic camera systems, infrared camera systems, RGB camera systems, and combinations of these, for gesture detection and recognition. Additionally, the computing device 800 may be equipped with accelerometers or gyroscopes that enable detection of motion. The output of the accelerometers or gyroscopes may be provided to the display of the computing device 800 to render immersive augmented reality or virtual reality.

A computing device may include radio(s) 824. The radio 824 transmits and receives radio communications. The computing device may be a wireless terminal adapted to receive communications and media over various wireless networks. Computing device 800 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

What is claimed is:

1. One or more computer-readable media having a plurality of executable instructions embodied thereon, which, when executed by one or more processors, cause the one or more processors to perform a method comprising:

accessing a document, the document comprising a set of glyphs of a text object;

determining a tracking pattern for the set of glyphs that identifies spacing of the set of glyphs in the document based on a position of a glyph of the set of glyphs in the document relative to a corresponding position of the glyph when automatic kerning is applied; and reconstructing the spacing of the text object in the document by applying the tracking pattern to the set of glyphs.

2. The one or more computer-readable media of claim 1, wherein determining the tracking pattern for the set of glyphs further comprises:

determining a left edge of the glyph and a right edge of the glyph;

determining a left bearing from the left edge of the glyph and a right bearing from the right edge of the glyph based on a corresponding font of the glyph; and determining the position of the glyph based on at least one of the left bearing and the right bearing of the glyph.

3. The one or more computer-readable media of claim 1, wherein determining the tracking pattern for the set of glyphs further comprises:

determining a gap between a right bearing of the glyph to a corresponding left bearing of a different glyph of the set of glyphs;

determining an automatic kerning gap between the right bearing of the glyph to the corresponding left bearing of the different glyph when automatic kerning is applied to the set of glyphs; and determining the spacing of the tracking pattern based on a difference between the gap and the automatic kerning gap.

4. The one or more computer-readable media of claim 1, wherein the tracking pattern is at least one of positive tracking and negative tracking.

5. The one or more computer-readable media of claim 1, wherein determining the tracking pattern for the set of glyphs further comprises:

determining a difference between the position of the glyph of the set of glyphs in the document relative to the corresponding position of the glyph when automatic kerning is applied to be within a threshold tolerance of zero; and determining the spacing of the tracking pattern to be zero.

6. The one or more computer-readable media of claim 1, wherein determining the tracking pattern for the set of glyphs further comprises:

determining that a difference between the position of the glyph to the corresponding position of the glyph when automatic kerning is applied is within a threshold tolerance of the tracking pattern, wherein the threshold tolerance is based on a font size of the set of glyphs.

7. The one or more computer-readable media of claim 1, wherein reconstructing the spacing of the text object in the document further comprises:

applying a custom kerning value to the glyph based on a difference between the position of the glyph and an expected position of the glyph with the tracking pattern applied, wherein the difference is below a threshold value with respect to the tracking pattern.

8. The one or more computer-readable media of claim 1, the method further comprising:

determining a location of a space character to be inserted between adjacent glyphs of the set of glyphs based on a difference between associated positions of the adjacent glyphs, wherein the difference is above a threshold value with respect to the tracking pattern; and inserting the space character into the set of glyphs in the document.

9. The one or more computer-readable media of claim 1, the method further comprising:

responsive to a user triggering a search function for at least a portion of the set of glyphs, identifying the at least the portion of the set of glyphs.

10. The one or more computer-readable media of claim 1, the method further comprising:

responsive to a user triggering a find and replace function to replace at least a portion of the set of glyphs with a different set of glyphs, replacing the at least the portion of the set of glyphs with the different set of glyphs and applying the tracking pattern to the different set of glyphs in the document.

11. A computer-implemented method comprising:

accessing a document, the document comprising a set of glyphs of a text object;

determining a tracking pattern for the set of glyphs that identifies spacing of the set of glyphs in the document based on a position of a glyph of the set of glyphs in the document relative to a corresponding position of the glyph when automatic kerning is applied;

determining a location of a space character to be inserted between adjacent glyphs of the set of glyphs based on a difference between associated positions of the adjacent glyphs, wherein the difference is above a threshold value with respect to the tracking pattern; and reconstructing the spacing of the text object in the document by applying the tracking pattern to the set of glyphs and inserting the space character into the set of glyphs.

12. The computer-implemented method of claim 11, wherein determining the tracking pattern for the set of glyphs further comprises:

determining a left edge of the glyph and a right edge of the glyph;

determining a left bearing from the left edge of the glyph and a right bearing from the right edge of the glyph based on a corresponding font of the glyph; and determining the position of the glyph based on at least one of the left bearing and the right bearing of the glyph.

13. The computer-implemented method of claim 11, wherein determining the tracking pattern for the set of glyphs further comprises:

determining a gap between a right bearing of the glyph to a corresponding left bearing of a different glyph of the set of glyphs;

determining an automatic kerning gap between the right bearing of the glyph to the corresponding left bearing of the different glyph when automatic kerning is applied to the set of glyphs; and determining the spacing of the tracking pattern based on a corresponding difference between the gap and the automatic kerning gap.

14. The computer-implemented method of claim 11, wherein determining the tracking pattern for the set of glyphs further comprises:

determining that a corresponding difference between the position of the glyph to the corresponding position of the glyph when automatic kerning is applied is within a threshold tolerance of the tracking pattern, wherein the threshold tolerance is based on a font size of the set of glyphs.

15. The computer-implemented method of claim 11, wherein reconstructing the spacing of the text object in the document further comprises:

applying a custom kerning value to the glyph based on a corresponding difference between the position of the glyph and an expected position of the glyph with the tracking pattern applied, wherein the difference is below the threshold value with respect to the tracking pattern.

16. A computing system comprising:

a processor; and a non-transitory computer-readable medium having stored thereon instructions that when executed by the processor, cause the processor to perform operations including:

accessing a document, the document comprising a set of characters of a text object;

determining a tracking pattern for the set of characters corresponding to uniform spacing of the set of characters in the document based on a position of a character of the set of characters in the document relative to a corresponding position of the character when automatic kerning is applied; and reconstructing the uniform spacing of the text object in the document by applying the tracking pattern to the set of characters.

17. The computing system of claim 16, wherein determining the tracking pattern for the set of characters further comprises:

determining a left edge of the character and a right edge of the character;

determining a left bearing from the left edge of the character and a right bearing from the right edge of the character based on a corresponding font of the character; and determining the position of the character based on at least one of the left bearing and the right bearing of the character.

18. The computing system of claim 16, wherein determining the tracking pattern for the set of characters further comprises:

determining a gap between a right bearing of the character to a corresponding left bearing of a different character of the set of characters;

determining an automatic kerning gap between the right bearing of the character to the corresponding left bearing of the different character when automatic kerning is applied to the set of characters; and determining the uniform spacing of the tracking pattern based on a difference between the gap and the automatic kerning gap.

19. The computing system of claim 16, wherein reconstructing the uniform spacing of the text object in the document further comprises:

applying a custom kerning value to the character based on a difference between the position of the character and an expected position of the character with the tracking pattern applied, wherein the difference is below a threshold value with respect to the tracking pattern.

20. The computing system of claim 16, the operations further including:

determining a location of a space character to be inserted between adjacent characters of the set of characters based on a difference between associated positions of the adjacent characters, wherein the difference is above a threshold value with respect to the tracking pattern; and inserting the space character into the set of characters in the document.

* * * * *